United States Patent
Horikawa et al.

[11] 3,937,764
[45] Feb. 10, 1976

[54] POLYMER ELECTROLYTES

[75] Inventors: Hideichi Horikawa; Shitomi Katayama; Hajime Serita, all of Akita; Noboru Masuda, Kawaguchi, all of Japan

[73] Assignee: Denki Onkyo Co., Ltd., Tokyo, Japan

[22] Filed: Dec. 11, 1972

[21] Appl. No.: 314,033

Related U.S. Application Data
[63] Continuation-in-part of Ser. No. 160,541, July 7, 1971, abandoned.

[30] Foreign Application Priority Data
July 9, 1970   Japan................... 45-60084

[52] U.S. Cl..... 260/895; 260/33.4 R; 260/33.6 UA; 260/33.8 UA; 260/34.2; 260/876 R; 260/887
[51] Int. Cl.$^2$........................ C08L 39/04
[58] Field of Search................... 260/895, 887

[56] References Cited
UNITED STATES PATENTS
| | | | |
|---|---|---|---|
| 3,418,393 | 12/1968 | King.................. | 260/895 |
| 3,760,034 | 9/1973 | Critchfield et al........ | 260/895 |

Primary Examiner—Murray Tillman
Assistant Examiner—J. Ziegler
Attorney, Agent, or Firm—Armstrong, Nikaido & Wegner

[57] ABSTRACT

Polymer electrolyte compositions having polymerized monomer units of the structural formula:

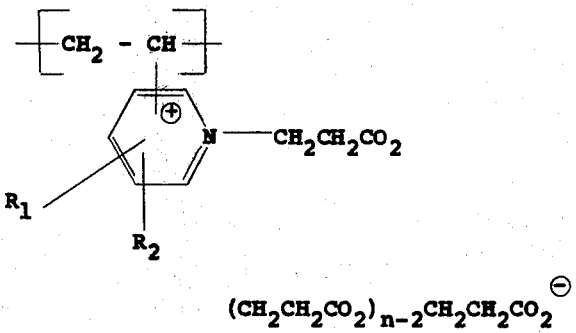

or acidic or alkaline salts of these compositions. $R_1$ and $R_2$ are hydrogen, methyl or ethyl. Also disclosed are methods for producing these compositions by reacting β-propiolactone and a polymer composition including vinylpyridine monomer units, by hydrolyzing a neutral salt of the above structural formula to obtain a N-(2-carboxyethyl) poly-γ-vinylpyridine acidic or alkaline salt, by reacting the N-(2-carboxyethyl) poly-γ-vinyl-pyridine salt with an acid or alkali to form a corresponding acid, neutral or alkaline salt, and by reacting a diluted or weak acid or alkali under nonhydrolyzing conditions with a polymer of the above structural formula to form a corresponding acidic, neutral or basic salt.

18 Claims, No Drawings

POLYMER ELECTROLYTES

CROSS REFERENCE TO A RELATED APPLICATION

This application is a continuation-in-part of copending U.S. Pat. application Ser. No. 160,541 filed July 7, 1971 by the inventors herein and now abandoned.

SUMMARY OF THE INVENTION

One embodiment of the invention is directed to an electrolyte composition comprising a polymer with a degree of polymerization defined in terms of inherent viscosity of from about 0.2 to about 5 at a concentration of 0.5g./100 ml. methanol at 30°C, having a plurality of connected monomer units of the structural formula:

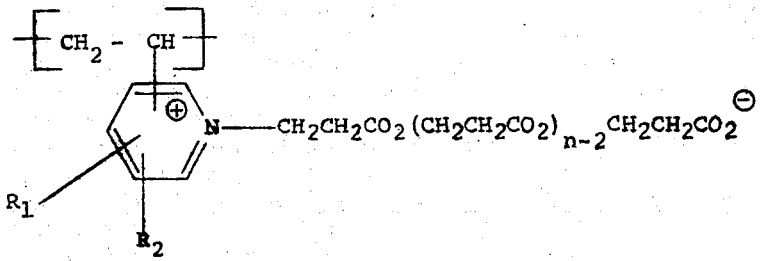

wherein $R_1$ and $R_2$ are hydrogen, methyl or ethyl, $n$ has an average value greater than about 0.2 and less than that producing an X-ray crystalline pattern of poly-$\beta$-propiolactone homopolymer. Said polymer is N-(poly-$\beta$-propiolactone) substituted poly-$\alpha$-vinylpyridine, N-(poly-$\beta$-propiolactone) substituted poly-$\beta$-vinylpyridine or N-(poly-$\beta$-propiolactone) substituted poly-$\beta$-vinylpyridine. Preferably, said polymer comprises at least 10 mole percent of said monomer units and the average value of $n$ is less than about 30. More preferably, the average value of $n$ is less than about 5. Said polymer, according to different embodiments, can be a neutral, acidic or alkaline salt having a plurality of monomer units consisting of the structural formula set forth above.

In accordance with another embodiment, said polymer unit has the structural formula:

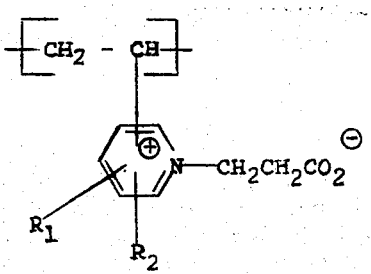

The polymer of this embodiment can be a neutral acidic or alkaline salt having a plurality of monomer units consisting of the structural formula set forth.

The present invention is further directed to an electrolyte composition comprising a homopolymer having monomer units represented by the structural formula:

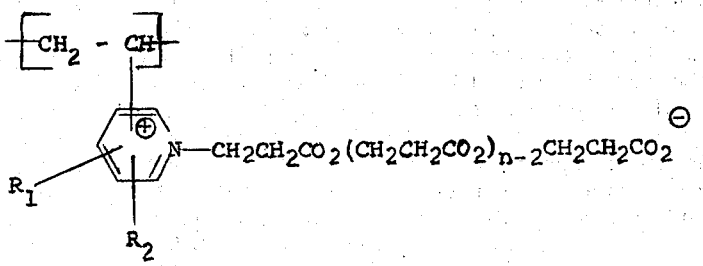

wherein $R_1$ and $R_2$ are hydrogen, methyl or ethyl, and $n$ is the average graft chain length expressed by the repeating units of ring-opened pripiolactone, $n$ having a value greater than about 0.2 and less than that producing an X-ray diffraction pattern of poly-$\beta$-propiolactone homopolymer, the average degree of polymerization expressed in terms of the inherent viscosity of said polymer being from about 0.2 to 5 at a concentration of 0.5g/100 ml. methanol at 30°C. Preferably, n is less than about 30 and, more preferably, less than about 5. Said polymer can be N-(poly-$\beta$-propiolactone) substituted poly-$\gamma$-vinylpyridine, or an acidic or alkaline salt thereof. Optionally, said polymer can be N-(poly-$\beta$-propiolactone) substituted poly-$\beta$-vinylpyridine, or an acidic or alkaline salt thereof. Finally, said polymer can be N-(poly-$\beta$-propiolactone) substituted poly-$\gamma$-vinylpyridine, or an acidic or alkaline salt thereof.

According to a further embodiment, said polymer of the immediately preceding paragraph can be N-(2-carboxyethyl) poly$\alpha$-vinylpyridine or an acidic or alkaline salt thereof, N-(2-carboxyethyl) poly-$\beta$-vinylpyridine or an acidic or alkaline salt thereof or N-(2-carboxyethyl) poly-$\gamma$-vinylpyridine or an acidic or alkaline salt thereof.

The present invention also relates to an electrolyte composition comprising a graftpolymer, having a degree of polymerization expressed in terms of inherent viscosity of from about 0.2 to about 5 at a concentration of 0.5g/100 ml. methanol at 30°C., of:

a. polymerized vinylpyridine monomer units each of the structural formula:

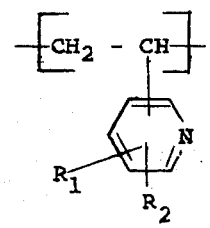

wherein $R_1$ and $R_2$ are hydrogen, methyl or ethyl;

b. β-propiolactone.

Preferably, from about 1 to about 5 moles of β-propiolactone are present per mole of vinylpyridine monomer. Said graftpolymer advantageously comprises at least 10 mole percent of said monomer units. Said composition can be graftpolymer of a homo-polyvinylpyridine and β-propiolactone. Said composition can also be a graftpolymer of β-propiolactone and a copolymer of vinylpyridines. Further, said polymerized vinylpyridine monomers can be present as a copolymer of at least one vinylpyridine with at least one other monomer copolymerizable therewith. Moreover, said polymerized vinylpyridine monomers can be blended with at least one other polymer. Advantageously, said vinylpyridine monomers are at least one member selected from the group consisting of 2-vinylpyridine, 5-ethyl-2-vinylpyridine, 2-methyl-6-vinylpyridine, 2,4-dimethyl-6-vinylpyridine, 3-vinylpyridine, 2-methyl-5-vinylpyridine 4-methyl-5-vinylpyridine, 4-vinylpyridine, 2-methyl-4-vinylpyridine. Said graftpolymer can further include at least one other type of ethylenically-unsaturated monomer selected from the group consisting of styrene, acrylonitrile, methylacrylate, methyl methacrylate, vinylacetate, isoprene. Said graftpolymer can also include at least one other type of ethylenically-unsaturated monomer containing acidic functional groups selected from the group consisting of acrylic acid, methacrylic acid and crotonic acid, the number of acidic functional groups being less than the number of vinylpyridine monomers.

A further aspect of the invention concerns a method for preparing a polymer electrolyte comprising:

a. reacting in a substantially inert liquid reaction medium, β-propiolactone and a polymer composition including polymerized vinylpyridine monomer units each of the structural formula:

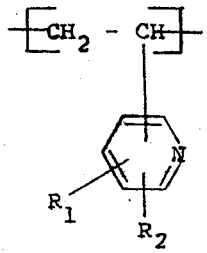

wherein $R_1$ and $R_2$ are hydrogen, methyl or ethyl, to form a graftpolymer having monomer units of the structural formula:

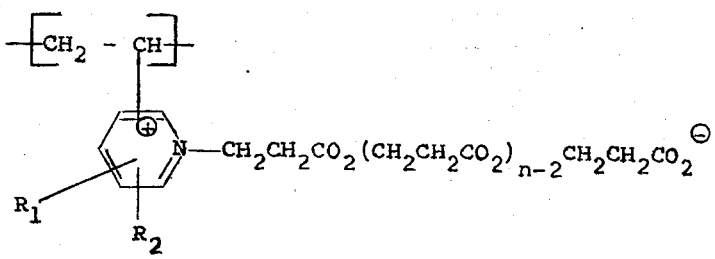

wherein $n$ is greater than 0.2, and b. recovering the graftpolymer from the reaction mixture.

Preferably, the reaction is carried out at a temperature below 160°C and above the freezing point of the reaction medium. More preferably, said temperature is between 0° and 100°C. Said β-propiolactone is most suitably present in an amount less than that producing a graftpolymer exhibiting X-ray crystalline patterns of β-propiolactone homopolymer, preferably from about 1 to about 5 moles per mole of vinylpyridine monomer. Said substantially inert liquid reaction medium is advantageously a solvent or dispersant for said polymer composition and said graftpolymer. Said solvent in one embodiment is an aprotic solvent which activates the basicity of the vinylpyridine units, such as an alcohol or water. In this case, the reaction temperature is preferably about 0° and 30°C. In another embodiment said solvent is an aprotic solvent which rarely activates the basicity of the vinylpyridine units, such as chloroform or a hydrocarbon. In this case, the reaction temperature is preferably between 30° and 100°C. Suitable solvents in general include chloroform, carbon tetrachloride, acetone, cyclohexanone, methylethylketone, tetrahydrofuran, a liquid hydrocarbon, methanol, ethanol, N,N-dimethylformamide, N,N-dimethylacetoamide, dimethylsulfoxide or N-methylpyrrolidine. Advantageously, about 300 to 3000 ml. of solvent or dispersant are employed per mole of said polymer composition. Said polymer composition can be a homopolymer or copolymer of vinylpyridine monomers. Said polymer composition preferably includes at least 10 mole percent of said polymerized vinylpyridine monomer units. Said polymer composition can be a blended polymer containing said polymerized vinylpyridine monomer units. Said polymerized vinylpyridine monomer units can also be present as a copolymer of at least one vinylpyridine with at least one other monomer copolymerizable therewith. Said vinylpyridine monomer units preferably are at least one member selected from the group consisting of 2-vinylpyridine, 5-ethyl-2-vinylpyridine, 2-methyl-6-vinylpyridine, 2,4-dimethyl-6-vinylpyridine, 3-vinylpyridine, 2-methyl-5-vinylpyridine, 4-methyl-5-vinylpyridine, 4-vinylpyridine, 2-methyl-4-vinylpyridine. Said other monomer is preferably an ethylenically-unsaturated monomer selected from the group consisting of styrene, acrylonitrile, methylacrylate, methyl methacrylate, vinyl acetate and isoprene. Said other monomer optionally can contain acidic functional groups selected from the group consisting of acrylic acid, methacrylic acid and crotonic acid, the number of acidic functional groups being less than or equal to the number of vinylpyridine monomers.

In the above method embodiment β-propiolactone can be added to an agitated liquid reaction medium containing the polymer composition in a controlled manner to minimize the temperature increase of the reaction system. Said β-propiolactone can be added as a solution. Optionally, a mixture of the reacted components is sealed in an ampoule and thereafter reacted. Said graftpolymer can be recovered by flowing the solution containing said graftpolymer across a heated plate to form a film. On the other hand, the graftpolymer can be recovered from the solution by combining therewith a nonsolvent which effects the precipitation of said graftpolymer. Said nonsolvent in one embodiment is neither acidic or alkaline. In another embodiment, said nonsolvent is a strong acid or alkali. According to a further embodiment, the resultant graftpolymer which is in the form of a salt is neutralized by an alkali. In another embodiment, the resultant graftpolymer which is in the form of a salt is neutralized by an acid.

The present invention also relates to a method for preparing a polymer electrolyte comprising hydrolyzing a neutral salt of a polymer having a plurality of monomer units of the structural formula:

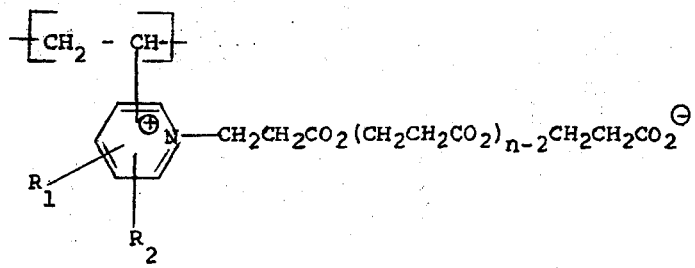

wherein $R_1$ and $R_2$ are hydrogen, methyl or ethyl, to form an acidic or alkaline salt of a polymer having a plurality of monomer units, each of the structural formula:

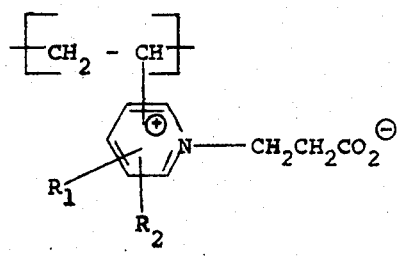

In one variation, said polymer is hydrolyzed by admixing said polymer in water or a solvent containing water and adding a strong acid or strong alkali thereto. Optionally, said polymer admixed in a solvent is mixed with an aqueous solution of a strong acid having a normality greater than 1 or a strong alkali having a normality greater than 1. Finally, said neutral salt can be hydrolyzed in a solvent therefor by using a strong acid or strong alkali which reacts with said neutral salt to form a precipitate of said acidic or alkaline salt. Said acid is preferably a mineral acid and said alkali is preferably an alkali metal hydroxide. Said acid or said alkali is advantageously present in an amount from 1 to 2 times the equivalent of the poly-β-propiolactone units grafted to monomer units. Hydrolysis is suitably carried out at a temperature ranging from room temperature to the boiling point of water. In the case of using an alkali, said temperature is preferably below about 40°C. Said acidic or alkaline salt of said polymer is preferably isolated from impurities by dissolving said acidic or alkaline salt and accompanying impurities in a solvent therefor and then reprecipitating the acidic or alkaline salt therefrom using a nonsolvent.

A still further embodiment concerns a method for preparing a polymer electrolyte comprising reacting an acid or an alkali, respectively, with an alkaline or acidic salt of a polymer having a plurality of monomer units of the structural formula:

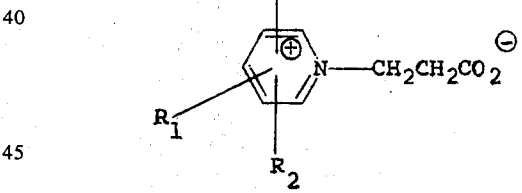

wherein $R_1$ and $R_2$ are hydrogen, methyl or ethyl, to form an acidic, neutral or alkaline salt therefor. In one variation, a weak acid having a $K_a$ greater than about $10^{-5}$ is combined with an alkaline salt of said polymer to form either a neutral or acidic salt thereof. In a further variation, an alkali having a $K_b$ greater than about $10^{-9}$ is combined with an acidic salt of said polymer to form either a neutral or alkaline salt thereof. Where said polymer contains hydrolyzable functional groups, said acid or alkali is advantageously select such that said functional groups will not be hydrolyzed. Optionally, a solution having a normality less than 1 of either a strong acid or strong alkali can be employed in place of the weak acids or alkalis.

An additional embodiment centers around a method for preparing a polymer electrolyte comprising reacting a diluted or weak acid with an acidity less than that for hydrolyzing poly-β-propiolactone units, or a diluted or weak alkali with a basicity less than that for hydrolyzing poly-β-propiolactone units with a polymer having a plurality of monomer units of the structural formula:

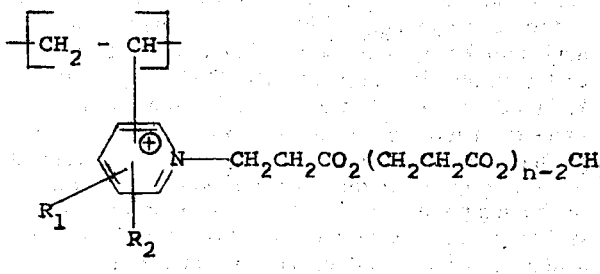

wherein $R_1$ and $R_2$ are hydrogen, methyl or ethyl, to form a corresponding acidic, alkaline or neutral salt of said polymer. In the cases of a weak acid or weak alkali, the $K_a$ or $K_b$, respectively, is preferably greater than $10^{-5}$ or $10^{-9}$. With respect to diluted acids or alkalis, such acids or alkalis can be strong acids or alkalis in a solution having a normality less than 1. Advantageously, said acid or alkali is a fully diluted mineral acid or alkali, an organic acid, an organic amine or ammonia.

DETAILED DESCRIPTION

In a first embodiment of the invention β-propiolactone is reacted with starting material polymers which contain polymerized vinylpyridine units that are either chemically bonded or physically blended, to produce polymers containing N-(poly-β-propiolactonyl) polyvinylpyridine units, in other words, graft-polymers. Herein the said graftpolymers are limited in their structures as such that the graft polymers should not show the X-ray crystalline patterns of β-propiolactone homopolymer in their X-ray diagrams.

In this embodiment, polymers as the starting materials may be any of homo-polyvinylpyridines, copolymers of two or more than two kinds of vinylpyridines, copolymers of vinylpyridines with monomers which are copolymerizable with vinylpyridines, or polymers blended with such said polymers.

These starting materials may be obtained by homo- or co-polymerizing the monomers shown below, or blending the resulting polymers with other blendable polymers:

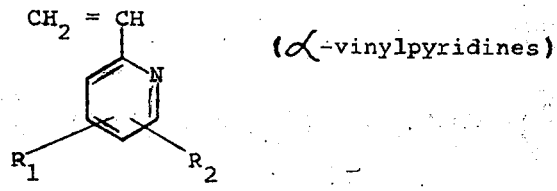
(α-vinylpyridines)

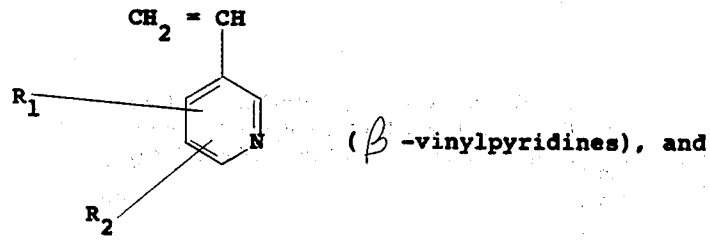
(β-vinylpyridines), and

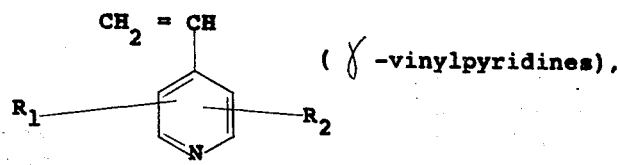
(γ-vinylpyridines), wherein the radicals $R_1$ and $R_2$ are any of hydrogen, methyl and ethyl radicals.

As such monomers, the following vinylpyridines are for example available: 2-vinylpyridine, 5-ethyl-2-vinylpyridine, 2-methyl-6-vinylpyridine, 2,4-dimethyl-6-vinylpyridine, 3-vinylpyridine, 2-methyl-5-vinylpyridine, 4-methyl-5-vinylpyridine, 4-vinylpyridine, 2-methyl-4-vinylpyridine.

The process of this embodiment treats polymers which contain polymerized vinylpyridine units either chemically bonded or physically blended, as the starting materials. The basic reactions are, however, those of the said vinylpyridine units, so the reactions of preparative process are represented by those of homo-polyvinylpyridines as follows:

Reactions of the process in this invention are as follows:

1. Poly-α-vinylpyridine as the starting material:

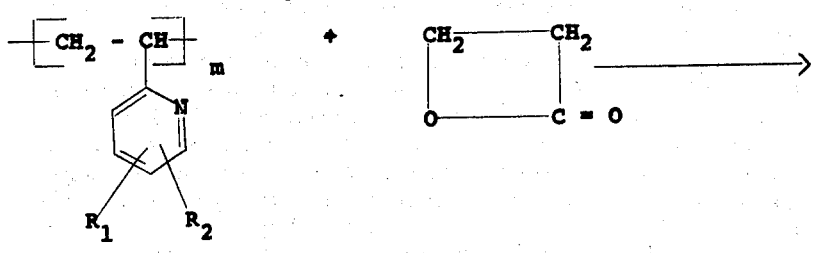

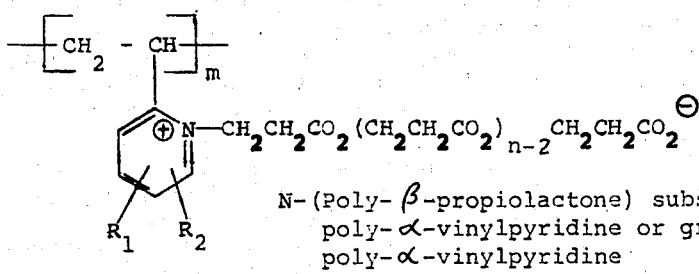

N-(Poly-$\beta$-propiolactone) substituted
poly-$\alpha$-vinylpyridine or graft
poly-$\alpha$-vinylpyridine 2. Poly-$\beta$-vinylpyridine as the starting material:

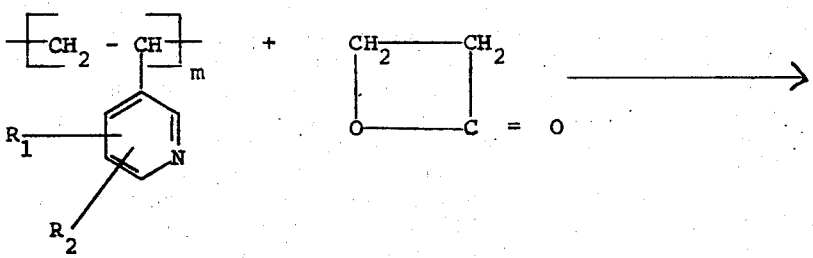

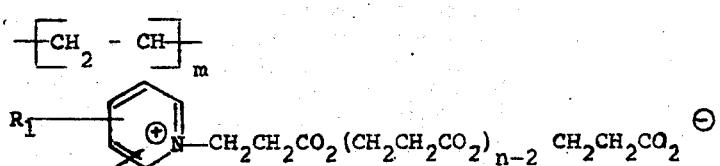

N-(poly-$\beta$-propiolactone) substituted
poly-$\beta$-vinylpyridine or graft
poly-$\beta$-vinylpyridine, and 3. Poly-$\gamma$-vinylpyridine as the starting material:

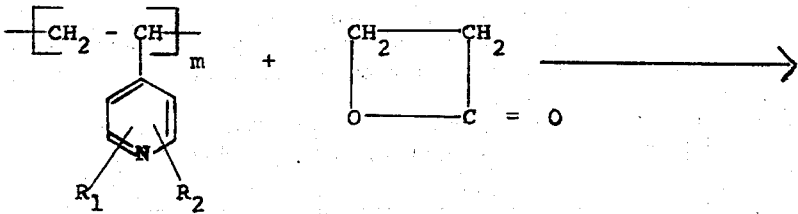

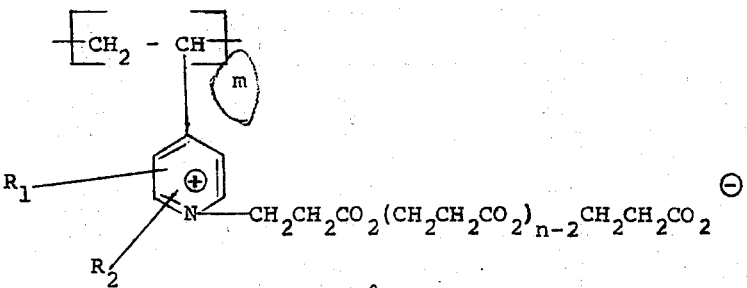

N-(poly-$\beta$-propiolactone) substituted
poly-$\gamma$-vinylpyridine or graft
poly-$\gamma$-vinylpyridine.

In these reaction formulas, $m$ denotes the average degree of polymerization of polyvinylpyridine (determined experimentally) while $n$ denotes the average degree of polymerization of the grafting poly-β-propiolactone. $m$, defined in terms of inherent viscosity, is most preferably about 0.2–5 at a graft polymer concentration of 0.5g./100 ml. methanol at 30°C. $n$ is the "average graft chain length expressed by the resulting units of the ring-opened β-propiolactone." $n$ values are limited as such that the corresponding graft-polymers should not show the X-ray crystalline patterns of poly-β-propiolactone, which would appear with enough high $n$ values. Though not limited, $n$ values are preferably greater than 0.2 and within five but may be up to 30.

Describing further details of this embodiment, the starting polymer materials are in addition to the already discussed homo-polyvinylpyridines, copolymers of two or more than two different kinds of vinylpyridines with copolymerizable monomers such as styrenes, acrylonitrile, methacrylate, methyl methacrylate, vinylacetate, isoprene, etc., and blended polymers which contain polymerized vinylpyridine units. Copolymers and blended polymers which contain acidic functional groups whose mole fractions are equal to or exceed those of the vinylpyridine units, are not suitable as starting polymer units. Thus, special precautions must be taken with copolymers having acidic monomers and blended polymers having acid functional groups, e.g., those from acrylic acid, methacrylic acid and crotonic acid.

Polymerization can be carried out in suitable solvent or dispersant mediums. Solvent mediums may be those which either do not react with β-propiolactone or react therewith in a relatively slow manner compared with the reaction of the pyridine nucleus therewith. For this reason, acidic or basic solvents are not preferred. Solvents need not necessarily dissolve starting polymers. As noted, the reactions may also be carried out even in the dispersion states.

Solvent and dispersant mediums may be classified into two categories: (a) protic, which activate the basicity of the polyvinylpyridine units and (b) aprotic, which rarely activate the said basicity. Generally with few exceptions, protic mediums (a) like alcohols and water give graftpolymers (GPVP) with shorter graft chain length $n$, while aprotic mediums (b) like chloroform and hydrocarbons give graftpolymers with longer graft chain length.

Examples of suitable mediums are (a) protic mediums of water, methanol, ethanol and formamide and (b) aprotic mediums of chloroform, carbon tetrachloride, acetone, cyclohexanone, methylethylketone, tetrahydrofuran, liquid hydrocarbons, N,N-dimethylformamide, N,N-dimethylacetoamide, dimethylsulfoxide, and N-methylpyrrolidone.

The reaction may be carried out below 160°C and over the freezing temperature of the solution. The preferred reaction temperature is 0°–100°C in order to prevent the production of by-products and to yield suitably fast rates of reaction. Necessarily, the reaction temperature, however, depends on the types of solvents, e.g., lower temperatures like 0°–30°C are suitable for solvents (a) like water and alcohols, while higher temperatures like 30°–100°C are suitable for solvents (b) like chloroform and hydrocarbons.

Many kinds of reaction techniques may be adopted in the present invention. In preferred methods β-propiolactone itself or as a solution is added dropwise into the agitated solution or dispersion of a starting polymer containing polymerized vinylpyridine units, or the above said mixture is sealed in an ampoule and reacted with or without agitation. In the former method additional time for further agitation is preferred after the addition of β-propiolactone in order to complete the reaction.

Caution is necessary in mixing the starting materials. Preferably the β-propiolactone system is added to the system containing polymerized vinylpyridine units since the reverse often causes explosive reactions and sometimes the production of homo-poly-β-propiolactone. If the latter approach is employed, the addition time of β-propiolactone dropwise is advantageously such that the temperature of the reaction system does not increase too rapidly.

The amount of β-propiolactone to be used is usually from 1 to 5 moles per 1 mole of the pyridine nucleus.

The concentrations of the solution or dispersions of the starting polymers are most suitably those in which agitation or stirring can be carried out easily. 300 to 3000 ml. of solvent per 1 mole of a starting polymer have been found effective for this purpose.

The resulting N-(poly-β-propiolactone) substituted polymers may be treated by any of the following methods for example. When the resulting polymer is in a solution state, the solution may be poured on and spread over a glass plate and heated at 30°–180°C to give a film, or the solution may be poured into a non-solvent to yield a polymer precipitate. When the resulting polymer is produced as a precipitate, the precipitate may be either filtered or isolated by the evaporation of the solvent or by decantation.

Precipitation can be effected by pouring the polymer solution into a non-solvent as is well known. (Necessarily, the solubility or nonsolubility properties of a particular liquid are a function of a given polymer). Exemplary solvents and non-solvents are given in the following table taking an example of poly-4-vinylpyridine and the corresponding N-(poly-β-propiolactone) substituted poly-4-vinylpyridine.

Among the solvents in Table A, hydrochloric acid and aqueous sodium hydroxide, or in general acidic and alkaline mediums change graft polymers, not only of poly-4-vinylpyridine but of any starting polymers containing polymerized vinylpyridine units, into the corresponding acidic and alkaline graft polymer salts or into the acidic and alkaline salts of polymers with N-(2-carboxyethyl) poly-vinylpyridine units as will be described. (The graft poly-4-vinylpyridine with shorter graft chain length $n$ is near in its structure to N-(2-carboxyethyl) poly-4-vinylpyridine.) Thus, acidic and alkaline solvents are not suitable for precipitation if no change of the chemical structures of the graft polymers is desired.

The thus-prepared N-(poly-β-propiolactone) substituted polymers having following characteristics:

TABLE A

| Solvent | PVP | GPVP with longer graft chain length "n" | GPVP with shorter graft chain length "n" |
|---|---|---|---|
| Hydrochloric acid (1 Normal) | Sol | Sol | Sol |
| Water | Insol | Insol | Sol |
| Aqueous sodium hydroxide (1 normal) | Insol | Insol | Insol |
| Methanol | Sol | Sol | Sol |
| Ethanol | Sol | Sol | Sol |
| Dimethyl-sulfoxide | Sol | Sol | Sol |
| Chloroform | Sol | Sol | Insol |
| Ether | Insol | Insol | Insol |
| Hexane | Insol | Insol | Insol |

Note:
PVP — Poly-γ-vinylpyridine.
GPVP — Graft poly-γ-vinylpyridine, i.e., N-(poly-β-propiolactone) substituted poly-γ-vinylpyridine.
Sol — soluble.
Insol — insoluble.

As common characteristics, the graft polymers of the invention serve as polymer electrolytes in any of the acidic, neutral and alkaline states, exhibit rather low electric inherent resistivities and have good dyeability.

Graft polymers from starting polymers with richer amounts of poly-vinylpyridine units are adhesive to glass, stone, wood, metal, etc., and have sterilizing and antimold properties.

Solutions of water soluble graft polymers (shorter chain lengths) have lower surface tensions.

Thus, graft polymers or, in other words, N-(poly-$\beta$-propiolactone) substituted polymers prepared by the method of this invention may be used as e.g., antielectrostatic polymers, highly dyeable polymers, adhesive, biionic (both cationic and anionic) surface active reagents, sterilizer, antimolds, ion exchange resins, etc. Most of the graft polymers are active in the acidic, neutral or alkaline states.

Although polymer electrolytes obtained by the first embodiment of the invention as described above have the abovementioned properties and characteristics, polymer electrolytes containing poly-$\beta$-propiolactone units of longer chain length of $n$ (which are mainly obtained in with aprotic solvents which rarely activate the basicity of the polyvinylpyridine units) have smaller electric charge densities so that they are sometimes not fully suitable for the intended use.

The second embodiment of the present invention improves upon this weak point by offering a method for preparing polymer electrolytes which have higher electric charge densities, specifically, through hydrolysis of the polymer electrolytes of the first embodiment of the invention with acids or bases.

To best explain the second embodiment of the invention reaction formulas thereof are set forth hereinafter. These formulas continue from the reaction formulas of the first embodiment in which polyvinylpyridines are used as starting materials. "(N-$\alpha$)" designates N-(poly-$\beta$-propiolactone-substituted) poly-$\alpha$-vinylpyridine, (N-$\beta$) designates N-(poly-$\beta$-propiolactone-substituted) poly-$\beta$-vinylpyridine, and (N-$\gamma$) designates N-(poly$\beta$-propiolactone-substituted) poly-$\gamma$-vinylpyridine.

1.

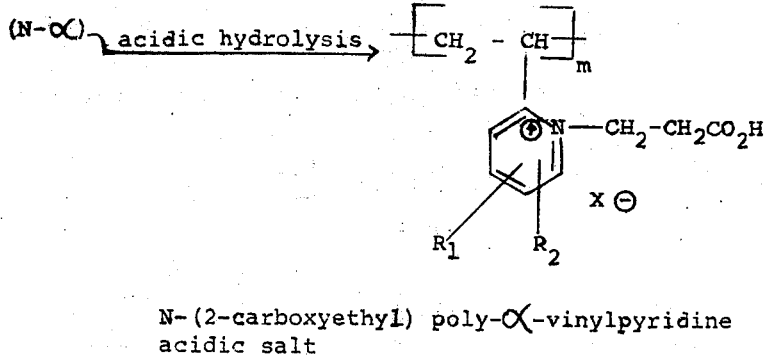

N-(2-carboxyethyl) poly-$\alpha$-vinylpyridine acidic salt

N-(2-carboxyethyl) poly-$\alpha$-vinylpyridine alkaline salt

2.

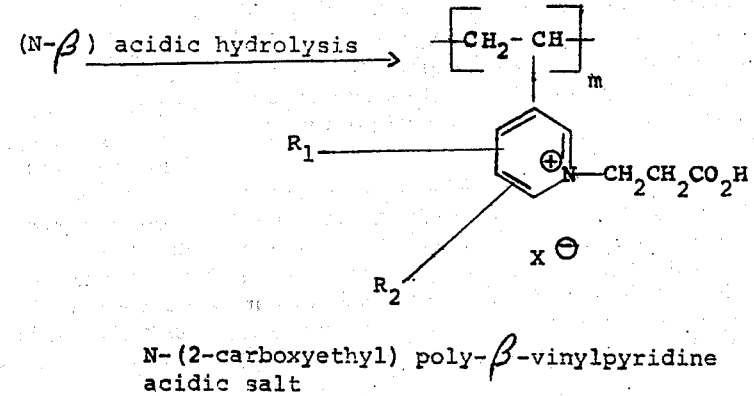

N-(2-carboxyethyl) poly-$\beta$-vinylpyridine acidic salt

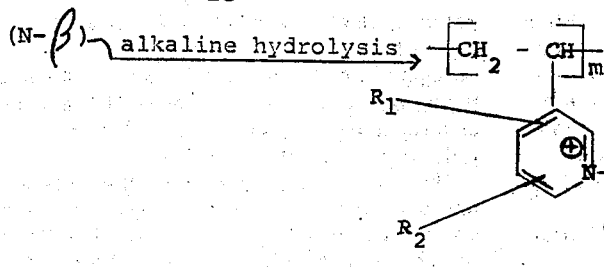

N-(2-carboxyethyl) poly-β-vinylpyridine alkaline salt

3.

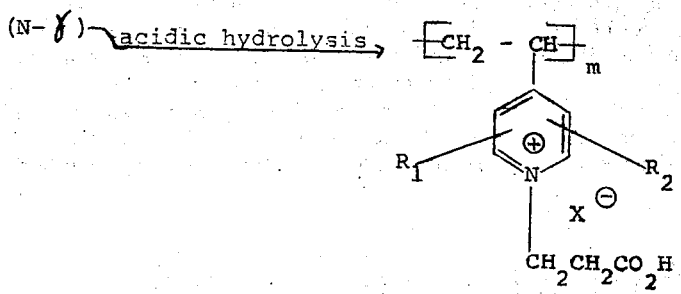

N-(2-carboxyethyl) poly-γ-vinylpyridine acidic salt

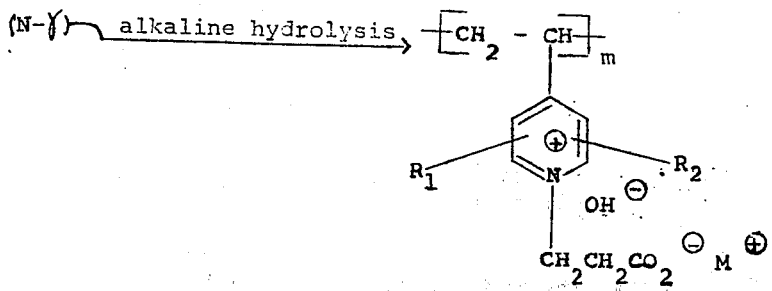

N-(2-carboxyethyl) poly-γ-vinylpyridine alkaline salt

In the above formulas, $M^{(+)}$ designates a cationic group, e.g., when sodium hydroxide is used as an alkali, $M^{(+)}$ is sodium cation $Na^{(+)}$. $X^{(-)}$ designates an anion group, e.g., when hydrochloric acid is used as an acid, $X^{(-)}$ is chlorine anion $Cl^{(-)}$.

N-(poly-β-propiolactone-substituted) polymers to be hydrolyzed by this embodiment are not limited to those prescribed polymers, but may be those copolymers and blend polymers containing polymerized vinylpyridine units and hydrolyzable functional groups. However, copolymers having hydrolyzable functional groups other than poly-β-propiolactone units which are hydrolyzed to contain carboxylic groups should be excluded, e.g., copolymers of acrylonitrile or methyl acrylate. Copolymers and blend polymers of styrene or vinylacetate can be used.

To hydrolyze N-(poly-β-propiolactone-substituted) polymers, N-(poly-β-propiolactone-substituted) polymers may be either dissolved or dispersed in water or in a solvent containing water, with a strong acid or alkali being added to the solution or mixture itself or as an aqueous solution (preferably greater than 1N). Another method is for N-(poly-β-propiolactone-substituted) polymers dissolved in a solvent to be mixed with an aqueous strong acid or alkali (preferably greater than 1N).

In these methods, the solvents, except water, should not be those which react with or are hydrolyzed by strong acid or alkalis.

Better examples of strong acids are mineral acids such as hydrochloric acid and sulfuric acid, while better examples of strong alkalis are alkali metal hydroxides. The amount of strong acid or alkali to be used may be that used in usual hydrolysis reactions, and is preferably the equivalent or up to twice the equivalent of the poly-β-propiolactone units counted in monomer units.

The temperature of hydrolysis is most suitably from the room temperature up to the boiling point of water. Stirring or agitation is preferred when the reaction system is heterogeneous. Hydrolysis can be complete within a few minutes or up to 24 hours, depending upon the other reaction conditions.

In the above treatment, alkaline hydrolysis sometimes causes decompositions of polymers at higher temperatures. In this case lower temperatures below about 40°C are preferred.

The thus-obtained salts of N-(2-carboxyethyl) polyvinylpyridines contain by products of oligo-poly-$\beta$-propiolactone, hydroxy-propionic acid, acrylic acids and their salts in many cases. When these impurities are excessive in amount, the resulting mixture may be (1) dissolved in a solvent and reprecipitated in a non-solvent, (2) may be extracted with a solvent to isolate N-(2-carboxyethyl) polyvinylpyridine salts, or (3) the impurities may be extracted.

The solvents to be used depend upon the types and structures of the salts of N-(2-carboxyethyl) polyvinylpyridines. Some examples of solvents and non solvents for polymer salts derived from homopolymers of poly-2-vinylpyridine and poly-2-vinylpyridine are as shown in the following table.

TABLE B

| Polymer Solvent | Hydrochloric salt | Sodium salt |
|---|---|---|
| Water | Soluble | Insoluble |
| 1 N aqueous hydrochloride | Soluble | Soluble |
| 1 N aqueous sodium hydroxide | Insoluble | Insoluble |
| Methanol | Soluble | Soluble |
| Ether | Insoluble | Insoluble |
| Ethanol | Soluble | Soluble |
| Hexane | Insoluble | Insoluble |

In obtaining the results of this table, hydrochloric salt was converted into sodium salt by treatment with sodium hydroxide, and sodium salt was converted into hydrochloric salt by treatment with hydrochloric acid. (Note that 1 N designates a 1 Normal solution.)

Polymers obtained by the methods of the second embodiment have higher electric charge densities than polymers obtained by the method of the first embodiment.

The third embodiment is characterized in that salts of N-(2-carboxyethyl) polyvinylpyridines are neutralized by acids or alkalis to give corresponding acidic salts, alkaline salts and neutral salts.

In relation to the second embodiment described thus far, the method of the third embodiment in which charge densities of the resulting polymers are big, is described below. [Charge densities and intensities of the resulting acid and basic polymer electrolytes of the third emodiment are almost the same as those of polymer electrolytes of the second embodiment while neutral polymer electrolytes of the third embodiment have the similar charge intensities as those of polymer electrolytes obtained by the method of the first embodiment.]

Reaction formulas of this embodiment are shown below, wherein (N-C-$\alpha$) designates N-(2-carboxyethyl) poly-$\alpha$-vinylpyridine, (N-C-$\beta$) designates N-(2-carboxyethyl) poly-$\beta$-vinylpyridine, and (N-C-$\gamma$) designates N-(2-carboxyethyl) poly-$\gamma$-vinylpyridine.

1.

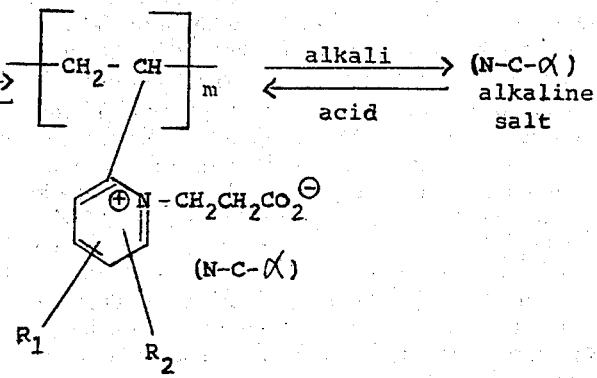

2.

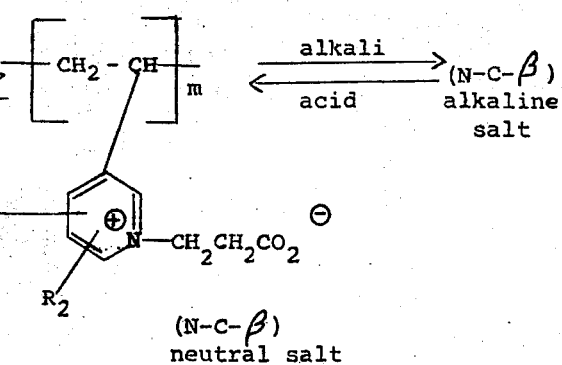

3.

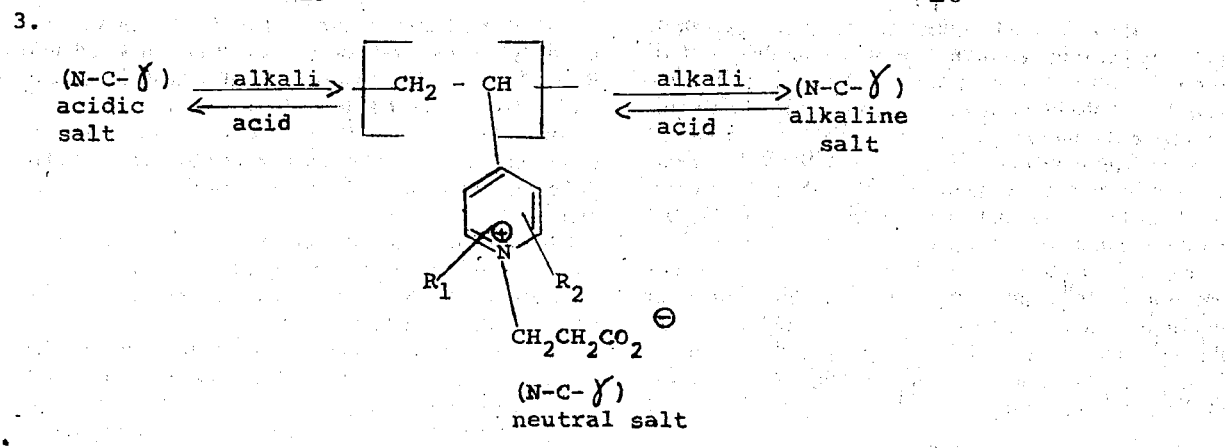

In more detail, in this embodiment an acidic salt of N-(2-carboxyethyl) polyvinylpyridine is neutralized with alkali to produce a neutral salt, which is converted into an alkaline salt with further treatment with alkali. An alkaline salt of N-(2-carboxyethyl) polyvinylpyridine is neutralized with acid to produce a neutral salt, which is converted into an acidic salt by further treatment with acid.

An alkaline salt of the polymer is converted at the isoelectric point by the addition of about the equivalent amount of acid into a neutral salt, which is converted into an acidic salt by the addition of the further equivalent amount of acid.

On the other hand, an acidic salt of the polymer is converted at the isoelectric point by the addition of about the equivalent amount of alkali into a neutral salt, which is converted into an alkaline salt by the addition of the further equivalent amount of alkali.

The resulting polymers of this embodiment are characterized by their high electric charge densities.

Acids to be used in this embodiment are preferably weak acids which are more acidic than propionic acid (or a $K_a$ greater than about $10^{-5}$). In the same manner, alkalis are preferably weak alkalis which are more basic than pyridine (or a $K_b$ greater than about $10^{-9}$). Optionally, solutions having a normality less than about 1 of either a strong acid or strong alkali can be employed. For example, fully a diluted mineral acid or alkali, an organic acid (e.g., acetic, propionic and capric acids), a primary, secondary or tertiary organic amine (e.g., methylamine) or ammonia may be used.

With copolymers or blend polymers whose functional groups may be hydrolyzed, weaker or diluted acids and alkalis which would not hydrolyze those functional groups are preferred.

The temperature and time conditions for this embodiment are preferably the same as those of the fourth embodiment to be set forth hereinafter.

The thus far described second and third embodiment of the invention relate to the hydrolysis of N-(poly-β-propiolactone-substituted) polymers and the neutralization of the resulting polymers.

When no or little hydrolysis of the poly-β-propiolactone units of N-(poly-β-propiolactone-substituted) polymers is wanted, only increasing the ionic strength or intensity being desired, the following method of the fourth embodiment may be applied.

This embodiment is characterized in that N-(poly-β-propiolactone-substituted) polymers obtained by method of the first embodiment are treated with an acid or alkali which is more acidic or basic than, respectively, propionic acid (or a $K_a$ greater than about $10^{-5}$) or a pyridine nucleus (or a $K_b$ greater than about $10^{-9}$), to produce corresponding acidic, alkaline or neutral salts. Optionally, a diluted acid or alkali comprised of a solution having a normality less than about 1 can be employed.

In this method, a diluted acid, diluted alkali, weak acid or weak alkali of the above strength which cannot, or rarely does, hydrolyze poly-β-propiolactone units, is used to produce a corresponding polymer salt. For example, fully a diluted mineral acid or alkali, an organic acid (e.g., acetic, propionic and capric acids), a primary, secondary or tertiary organic amine (e.g., methylamine) or ammonia may be used.

The temperatures for the reaction of the fourth embodiment are most suitably below 100°C, preferably near or below room temperature down to 0°C. Lower temperatures can be employed so long as the reaction mixture forms a solution or dispersion. Depending upon the other conditions, the reaction time usually varies from a few minutes to an hour.

Reaction formulas for the method of this embodiment are shown below. These reaction formulas, however, illustrate the case employing N-(poly-β-propiolactone-substituted) polymers (obtained by the representative reaction formulas of the method of the first embodiment using polyvinylpyridines as the starting materials).

1. From N-(poly-β-propiolactone-substituted) poly-α-vinylpyridine:

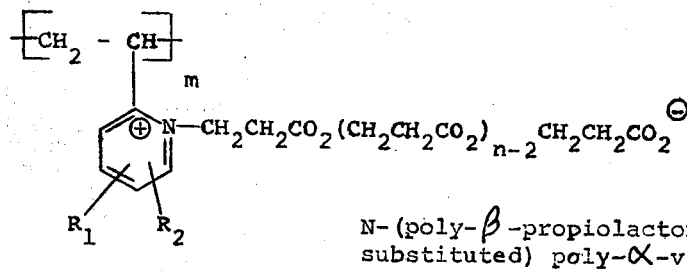

N-(poly-β-propiolactone-substituted) poly-α-vinylpyridine neutral salt

Reacted with acid HX:

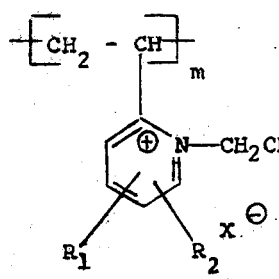

N-(poly-β-propiolactone-substituted) poly-α-vinylpyridine acidic salt

Treated with alkali MA:

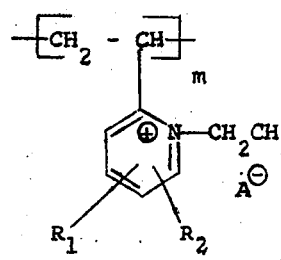

ibid, alkaline salt

2. From N-(poly-β-propiolactone-substituted) poly-β-vinylpyridine:

Treated with acid HX:

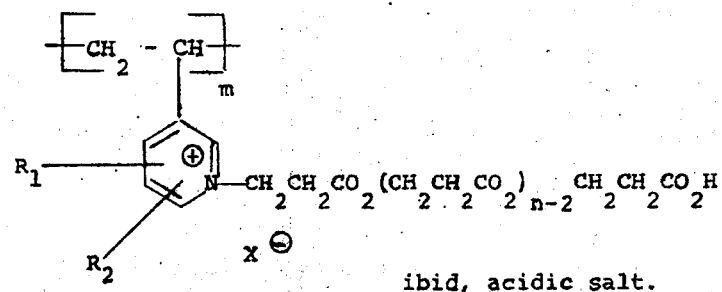

ibid, acidic salt.

Treated with alkali MA:

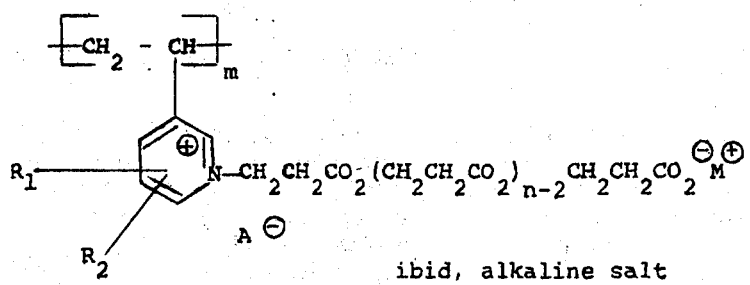

ibid, alkaline salt

3. From N-(poly-β-propiolactone-substituted) poly-γ-vinylpyridine:

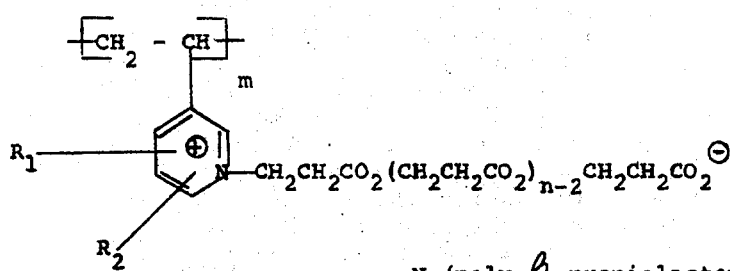

N-(poly-β-propiolactone-substituted) poly-β-vinylpyridine neutral salt

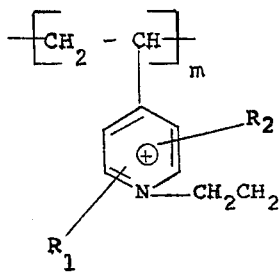

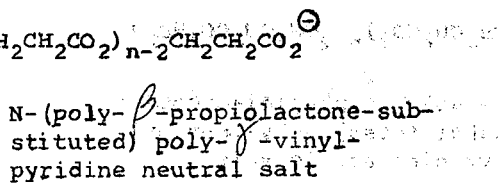

N-(poly-β-propiolactone-substituted) poly-ϒ-vinylpyridine neutral salt

Treated with acid HX:

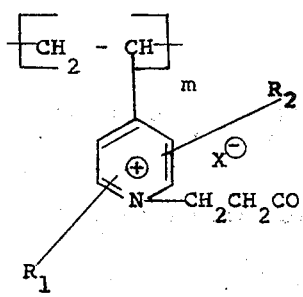

ibid, acidic salt

Treated with alkali MA:

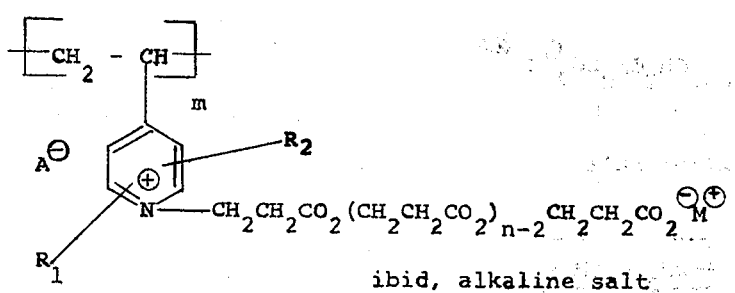

ibid, alkaline salt

In the above formulas, HX is acid, H is proton, X is anion, MA is alkali, M is cation and A is anion.

The method of this embodiment being as described above, the resulting polymers have the same charge density as and higher charge intensities than those of N-(poly-β-propiolactone-substituted) polymers obtained by the method of the first embodiment.

Notably, where some hydrolysis occurs the average graft chain length n may be somewhat reduced as compared to the polymers of the first embodiment.

The following examples illustrate ways in which the principle of the invention has been applied, but are not to be construed as limiting its scope.

EXAMPLE 1

Preparation of poly-2-vinylpyridine

Into a three-necked flask, equipped with a stirrer and two condensers leading to a nitrogen inlet and a nitrogen outlet, were placed 120 g. of 2-vinylpyridine, 100 ml. of water, 1.5 g. of gelatine dissolved in 50 ml. water, 0.05 g. of sodium butylnaphthalene sulfonate dissolved in 50 ml. of water, and 0.5 g of α,α-azobisisobutyronitrile. The mixture was polymerized in a nitrogen atmosphere with stirring at 50°C for 3 days.

The resulting powderly poly-2-vinylpyridine was washed with hot water in a high speed mixer several times and then filtered.

Softening temperature was 183°–192°C with an intrinsic viscosity of 2.03 measured at a concentration of 0.5 g. of poly-2-vinylpyridine/100 ml. of ethanol at 30°C.

Reaction of poly-2-vinylpyridine with β-propiolactone (preparation of polymer electrolytes by the method of the First Embodiment (TABLE 1-1)

10.5 g. of the thus-obtained poly-2-vinylpyridine and 150 ml. of a solvent in Table 1-1 were placed in a three-necked flask equipped with a stirrer, nitrogen outlet and a dropping funnel leading to a nitrogen inlet. The mixture was stirred at 20°–25°C in a nitrogen atmosphere until it became a homogeneous solution. 7.21 –28.8 g. (the amount depending upon each run as tabulated in Table A of β-propiolactone were added from the dropping funnel dropwise into the solution which had been stirred and kept at 20°–25°C. After the addition of β-propiolactone (for 40–168 min.) was finished, the reaction was continued for an additional hour.

The resulting homogeneous solution of the polymer electrolyte was then poured into strongly agitated n-hexane 10 times in volume of that of the solution to give a gummy mass which was then combined with n-hexane and ground in a high speed mixer a few times until a powderly polymer electrolyte was obtained.

Any of the resulting polymer electrolytes tabulated in Table 1-1 gave a film strongly adhesive to a glass, stone, steel, copper, aluminium, wood, or porcelain plate. Polymer electrolytes prepared in methanol have higher melting points and are soluble in water. Polymer electrolytes prepared in chloroform and N,N-dimethylformamide have higher melting points and are insoluble in water. The resulting films obtained on a plate of polytetrafluoroethylene are characteristic in their low electric volume inherent resistivities and higher surface resistivities.

cipitate a hydrolyzed polymer electrolyte.

Run 1-5-2. 1.73 g. of the polymer electrolyte (Run ml. of methanol. The soluble portion in methanol was poured into water to precipitate a hydrolyzed polymer electrolyte.

Hydrolysis with hydrochloric acid

Run 1-1-2. 2.00 g. of the polymer electrolyte (Run 1-2) were dissolved in 30 ml. of chloroform to give a homogeneous solution, which was mixed and agitated with 19.3 ml. of 1 normal hydrochloric acid. Volatile solvents and gas were removed from the mixture by

TABLE 1-1

| Run No. | $\beta$-PL (g.) | Adding time of $\beta$-PL (min.) | Solvent | Graft Ratio | Softening Temp. (°C) | $\eta_{inh}$ | $\sigma$ ohm | $\rho$ ohm/cm |
|---|---|---|---|---|---|---|---|---|
| 1-1 | 7.21 | 40 | $CHCl_3$ | 2.10 | 82 – 89 | 2.10 | $1.7 \times 10^{14}$ | $1.6 \times 10^{11}$ |
| 1-2 | 14.4 | 60 | $CHCl_3$ | 2.04 | 89 – 96 | 2.09 | $2.7 \times 10^{14}$ | $1.4 \times 10^{12}$ |
| 1-3 | 28.8 | 168 | $CHCl_3$ | 2.31 | 86 – 91 | 1.96 | $6.0 \times 10^{13}$ | $3.5 \times 10^{11}$ |
| 1-4 | 7.21 | 40 | DMF | 2.88 | 92 – 112 | 2.01 | $1.3 \times 10^{14}$ | $8.4 \times 10^{12}$ |
| 1-5 | 7.21 | 30 | McOH | 1.80 | 135 – 158 | 2.11 | $9.0 \times 10^{14}$ | $1.6 \times 10^{12}$ |

Reaction temperature = 20 – 25°C. $CHCl_3$ = chloroform. DMF = N, N-dimethylformamide. MeOH = methanol. $\sigma$ = surface inherent resistivity. $\rho$ = volume inherent resistivity. Resistivities were measured at $R_h$ = 42%, temp. = 18°C and Charged voltage — 250 V. Graft ratio = mole fraction of poly-$\beta$-propiolactone units divided by the mole fraction of poly-2-vinylpyridine units. The amount of poly-2-vinylpyridine used for every reaction is 10.5 g. Every reaction was carried out in a nitrogen atmosphere. Inherent viscosity ($\eta_{inh}$) was measured at a concentration of 0.5 g./100 ml. methanol at 30°C.

Hydrolysis of polymer electrolytes of the first embodiment by acids or bases by the method of the second embodiment (Table 1-2)

Hydrolysis with sodium hydroxide

Run 1-1-1. 2.00 g. of the polymer electrolyte (Run 1-1) were dissolved in 30 ml. of chloroform to give a homogeneous solution, which was mixed and then shaken with 14.1 ml. of 1 normal aqueous sodium hydroxide until the mixture became a milky emulsion. Chloroform and water were evaporated off from the emulsion in vacuum at room temperature to give a white mass, which was washed with water, dried and dissolved in 50 ml. of methanol. The insoluble portion was removed and the soluble portion, poured into water 10 times the volume of the methanol solution, to give a hydrolyzed polymer electrolyte.

Run 1-5-1. 1.71 g. of the polymer electrolyte (Run 1-5) were dissolved in 30 ml. of methanol, and then mixed and agitated with 12 ml. of 1 normal aqueous sodium hydroxide to give a homogeneous solution. Methanol and water were removed by a vacuum evaporation at the room temperature leaving a white solid, which was washed with water, dried and dissolved in 50 The resulting solution was poured into agitated ether 10 times the volume of the methanol solution, to prevacuum evaporation at room temperature leaving a white solid, which was dissolved in 50 ml. of methanol. 1-5) were dissolved in 30. ml. of methanol. The resulting solution was mixed and shaken with 14.3 ml. of 1 normal hydrochloric acid. Volatile solvents and gases were removed from the resulting solution by vacuum evaporation at room temperature to yield a white solid, which was dissolved in 50 ml. methanol. The methanol solution was then poured into agitated ether 10 times in volume of that of the solution to give a hydrolized polymer electrolyte precipitate.

The above four runs of hydrolyzing the polymer electrolytes obtained by the first embodiment were all carried out at room temperature (20°–25°C). Properties of the resulting hydrolyzed polymer electrolytes are tabulated in Table 1-2. As shown therein, the hydrolyzed polymer electrolytes have high softening points and low volume inherent resistivities. The resistivities were measured from the films obtained from the methanol solutions of the hydrolyzed polymer electrolytes.

TABLE 1-2

| Run No. | Polymer electrolyte by the 1st embodiment (g) | Solvent | Acid or base (ml.) | Softening Temp. (°C) | $\eta_{inh}$ | $\sigma$ ohm | $\rho$ ohm/cm |
|---|---|---|---|---|---|---|---|
| 1-1-1 | 2.003 | $CHCl_3$ | NaOH 14.1 | 208–228 | 1.58 | $1.8 \times 10^{15}$ | $6.0 \times 10^{12}$ |
| 1-1-2 | 2.00 | $CHCl_3$ | CHl 19.3 | 206–229 | 1.38 | $2.6 \times 10^{15}$ | $5.6 \times 10^{12}$ |
| 1-5-1 | 1.71 | McOH | NaOH 12.0 | 186–212 | 1.53 | $6.4 \times 10^{15}$ | $3.5 \times 10^{13}$ |
| 1-5-2 | 1.73 | McOH | HCl 14.3 | 186–219 | 1.46 | $1.8 \times 10^{15}$ | $5.2 \times 10^{12}$ |

Every solvent is 30 ml. The hydrolyses were carried out at 20 – 25°C. $\sigma$ is surface inherent resistivity, and $\rho$ is volume inherent resistivity measured at $R_h$ = 42%, temp. = 18°C and Charged voltage — 250 V. $\eta_{inh}$ is inherent viscosity measured at a concentration of 0.5 g./100 ml. methanol. $CHCl_3$ is chloroform, and MeOH is methanol. NaOH is sodium hydroxide, and HCl is hydrochloric acid.

Neutralizations of acid and base hydrolyzed polymers of the second embodiment by the method of the third embodiment Run 1-5-2-1. 0.800 g. of the hydrolyzed polymer electrolyte (Run 1-5-2) were dissolved in 30 ml. of hydrochloric acid in a conical flask followed by the addition of 4.8 ml. of 1 normal aqueous sodium hydroxide. The mixture was agitated for 10 min. at room temperature. Water was removed from the resulting mixture by vacuum evaporation at room temperature leaving a solid, which was dissolved in 50 ml. of methanol, some portions being insoluble.

The solution, after removal of the insoluble portion by filtration, was poured into agitated water to precipitate a basic polymer electrolyte.

Inherent viscosity at the concentration of 0.5 g./100 ml. methanol at 30°C was 1.40. The softening temperature was 192°–222°C while the surface inherent resistivity was $9.8 \times 10^{13}$ Ω ($R_h$=42%, Temp. = 18°C and charged voltage = 250 V.).

From the above Example 1, it can be concluded that:(a) neutral polymer electrolytes obtained by the method of the first embodiment have low softening temperatures because of low charge intensities; (b) neutral polymer electrolytes prepared in protic solvents in the first embodiment have higher softening temperatures than those prepared in aprotic solvents, because of the higher charge densities of the former; (c) acidic polymere electrolytes and basic polymer electrolytes prepared by the methods of the second or third embodiments have the highest softening temperatures due to high charge densities and intensities; (d) neutral polymer electrolytes prepared in protic solvents in the first embodiment and acidic polymer electrolytes prepared by the second or third embodiment are soluble in water, while neutral polymer electrolytes prepared in aprotic solvents in the first embodiment and basic polymer electrolytes prepared in the second or third embodiments are insoluble in water. Both series of polymers, however, are commonly soluble in methanol.

Neutralization of the polymer electrolyte of the first embodiment by the fourth embodiment 2.00 g. of the polymer electrolyte (Run 1-1) were dissolved in 30 ml. of methanol to give a homogeneous solution, into which was added 10 ml. of triethylamine dissolved in 30 ml. of water. The mixture was agitated at room temperature for 10 min. Solvents were removed from the mixture by vacuum evaporation to give a light yellow mass, which eas dissolved in 20 ml. of methanol and reprecipitated in 150 ml. of acetone to give a white mass which was filtered and dried in a vacuum.

All the polymer electrolytes are very adhesive to metals such as steel, copper, aluminium, zinc and platinum, stone, porcelain, glass, wood, paper, skin, vegetables, etc. Films can be formed either by dry methods or melt methods on a tetrafluoroethylene coated plate. The films have clinging (not adhesive) properties to any type of electrically unearthed materials, due to the electric charges.

Water-soluble polymer electrolytes have properties and characteristics of surface active reagents, detergents, anti-mold, anti-bacteria powers.

EXAMPLE 2

Preparation of poly-2-vinylpyridine 60.0 g. of 2-vinylpyridine, 60 ml. of dry ligroin and 0.600 g. of $\alpha,\alpha'$-azobisisobutyronitrile were sealed in a glass ampoule in a nitrogen atmosphere. The ampoule was maintained at 50°C without agitation for 7 days.

The resulting precipitate of poly-2-vinylpyridine was dissolved in a mixture of 25 ml. of pyridine and 240 ml. of toluene to yield a solution, which was poured into 2.8 liters of ligroin to produce a mass of poly-2-vinylpyridine. The mass was ground into powder in the presence of excess ligroin in a high speed mixer. The powder exhibited a softening temperature of 172°–174°C and an intrinsic viscosity in ethanol at 30°C of 1.18 resulted.

Reaction of poly-2-vinylpyridine with $\beta$-propiolactone (preparation of polymer electrolytes by the method of the first embodiment 6.3–8.4 g. of poly-2-vinylpyridine were dissolved in 150 ml. of methanol. The solution and 2.16–23.1 g. of $\beta$-propiolactone were sealed in a glass ampoule in a nitrogen atmosphere to give a homogeneous solution, which was kept at 50°C for 24 hours without agitation.

The resulting solution of the polymer electrolyte was added to a large quantity of 1 normal aqueous ammonia. The polymer electrolyte obtained was washed repeatedly into ten times the volume of rapidly stirred 1 normal ammonia in a mixer to give a powderly ammonium salt of a polymer electrolyte.

Table 2

| Run No. | poly-2-vinyl-pyridine (g.) | $\beta$-propio-lactone (g.) | softening point (°C) | Inherent viscosity | graft ratio |
|---------|----------------------------|-------------------------------|----------------------|--------------------|-------------|
| 2-1     | 6.31                       | 2.16                          | 238–263              | 1.39               | 0.074       |
| 2-2     | 8.41                       | 5.77                          | 239–258              | 1.13               | 0.100       |
| 2-3     | 8.41                       | 11.5                          | 212–223              | 1.02               | 0.117       |
| 2-4     | 8.41                       | 23.1                          | 204–216              | 0.54               | 0.154       |

Inherent viscosity was measured at a concentration of 0.500 g. of ammonium salt of polymer electrolyte/100 ml. of methanol at 30°C.

EXAMPLE 3

Preparation of poly-3-vinylpyridine

Into a polymerization reaction apparatus as described in Example 1 (for the preparation of poly-2-vinylpyridine) were placed 82 g. of 3-vinylpyridine, 100 ml. of water, a solution of 1.2 g. gelatine in 50 ml. water, a solution of 0.04 g. of sodium butylnapthalenesulfonate in 50 ml. of water and 0.5 g. of azobisisobutyronitrile in a nitrogen atmosphere. The polymerization reaction was carried out at 50°C in a oil bath for 3 days. At the end of this period the granule of the polymer was washed with normal water 4 times, washed with hot water 3 times and then filtered.

The softening point was 176°–183°C and the intrinsic viscosity was 1.76 measured at a concentration of 0.5 g. of poly-3-vinylpyridine /100 ml. of ethanol at 30°C.

Reaction of poly-3-vinylpyridine with $\beta$-propiolactone (preparation of polymer electrolytes by the method of the first embodiment Into a reaction apparatus as described in the corresponding part of Example 1 were placed 10.5 g. (0.10 mole) of this poly-3-vinylpyridine and 150 ml. of methanol, the apparatus being flushed with nitrogen. 7.21 g. to 14.4 g. of β-propiolactone in the dropping funnel was slowly dropped into the reaction vessel over a period of 40 to 60 min. with stirring being continued one hour thereafter. At the end of this period, the polymer obtained was poured into ten times the volume of ether to give a gummy polymer. This gummy polymer was reprecipited repeatedly into ten times the volume of ether to yield a polymer electrolyte.

Table 3

| Run No. | β-propio-lactone (g.) | Graft ratio | Inherent Viscosity | Softening Point (°C) |
| --- | --- | --- | --- | --- |
| 3-1 | 7.21 | 1.28 | 0.780 | 162–179 |
| 3-2 | 14.4 | 1.31 | 0.620 | 128–142 |

Reaction temperature was 25°–28°C. Inherent viscosity was measured at a concentration of 0.500 g. of polymer electrolyte/100 ml. of methanol at 30°C.

A transparent film was made from this polymer-methanol solution.

Hydrolysis of polymer electrolyte obtained by the first embodiment by the acid by the method of the second embodiment 2.10 g. of the foregoing polymer electrolyte were placed in a conical flask and dissolved in 30 ml. of methanol. After 20 ml. of 1 normal hydrochloric acid solution was added to the polymer solution and the latter vigorously agitated, the solvent was removed by evaporator using a water pump. A light brown solid resulted.

The solid was placed in the conical flask and dissolved in 50 ml. of methanol. The resulting solution was separated into a soluble part and insoluble part. The soluble part was poured into ten times the volume of ether to produce a hydrolyzed polymer electroltye.

An inherent viscosity of 0.740 was measured at the concentration of 0.500 g. of a hydrolyzed polymer electrolyte/100 ml. of methanol at 30°C. The softening point was found to be 168°–178°C.

Neutralization of hydrolyzed polymer of the second embodiment by the method of the third embodiment Run No. 3-1-1-1. 1.80 g. of hydrolyzed polymer were placed in a conical flask and dissolved in 30 ml. of methanol. After 16.8 ml. of 1 normal of sodium hydroxide solution were added into the polymer-methanol solution and the result vigorously agitated, solvents were removed through evaporation with a water pump to yield a sodium salt of a basic polymer electrolyte. The polymer was then washed with water, filtered and dried.

The softening point was determined to be 162°–186°C.

EXAMPLE 4

Preparation of poly-4 vinylpyridine 62 g. of freshly distilled 4-vinylpyridine and 0.025 g. of benzoylperoxide were placed in a glass tube, which was then flushed with nitrogen and sealed. The mixture was maintained at 50°C in an oil bath for 24 hr. At the end of this period, the polymer was dissolved in 1 liter of n-butanol and poured into a large quantity of water in a high speed mixer to give the granules of poly-4-vinylpyridine, which were filtered and dried.

The softening point was 221°–227°C while the inherent viscosity was determined to be 3.92 at a concentration of 0.500 g. of poly-4-vinylpyridine/100 ml. of methanol at 30°C.

Reaction of poly-4-vinylpyridine with β-propiolactone (preparation of polymer electrolytes by the method of the first embodiment Into a reaction apparatus described in the corresponding part of Example 1 were placed 2.63 g. of this poly-4-vinylpyridine and 50 ml. of water in a nitrogen atmosphere at 30°C. 0.017 g. to 0.050 g. of β-propiolactone in a dropping funnel were slowly dropped into the reaction flask for 2 hours, the mixture being stirred for 1 hour thereafter. At the end of this time, the reaction mixture was poured into 200 ml. of n-butanol in a high speed mixer to give a gummy polymer.

This gummy polymer was washed with 100 ml. of n-butanol for several times in a high speed mixer, filtered and dried leaving a powderly polymer electrolyte.

This polymer, containing a considerable amount of an acid component and other by-products, exhibited a low softening point as shown below.

Table 4

| Run No. | β-Propio-lactone (g.) | Graft ratio | Inherent Viscosity | Softening Point (°C) |
| --- | --- | --- | --- | --- |
| 4-1 | 0.025 | 0.479 | 0.720 | 102–106 |
| 4-2 | 0.017 | 0.489 | 1.09 | 97–103 |
| 4-3 | 0.050 | 1.31 | 1.01 | 105–106 |

Inherent viscosity was measured at a concentration of 0.500 g. of polymer electrolyte/100 ml. of methanol at 30°C.

The polymer dissolved in methanol was spread on a glass plate at 60°–80°C to give transparent film. The film was found to strongly adhere to the glass plate.

EXAMPLE 5

Reaction of poly-4-vinylpyridine with β-propiolactone (preparation of polymer electrolytes by the method of the first embodiment)

Into a glass tube were placed 2.63 g. poly-4-vinylpyridine prepared as in Example 4, 50 ml. water or 80 ml. methanol and 0.025 g. of β-propiolactone. The mixture was shaken, swept with nitrogen to remove air, sealed-off and maintained at 50°C in an oil bath for 24 hours.

Run No. 5-1. The reaction mixture which was obtained using 50 ml. water was poured into 200 ml. n-butanol with rapid stirring to give a gummy polymer which was washed further with 100 ml. n-butanol with rapid stirring to produce a powderly polymer electrolyte.

Run No. 5-2. The reaction mixture which was reacted in 80 ml. methanol was poured into 200 ml. of rapidly stirred ether to give a gummy polymer. The gummy polymer was washed further with 100 ml. rapidly stirred ether and a powderly polymer electrolyte resulted.

Table 5

| Run No. | Solvent (ml.) | Graft ratio | Inherent viscosity | Softening Point (°C) |
|---|---|---|---|---|
| 5-1 | Water 50 | 1.64 | 1.23 | 97–99 |
| 5-2 | methanol 80 | 1.13 | 1.13 | 165–170 |

Inherent viscosity was measured at a concentration of 0.500 g. of polymer electrolytes/100 ml. of methanol at 30°C.

As shown in Table 5, the polymer electrolyte of Run No. 5-1 exhibited a low softening point because of contaminating by-products. The polymer electrolyte of Run No. 5-2, on the other hand, had a high softening point.

EXAMPLE 6

Preparation of poly-4-vinylpyridine

Into a glass tube flushed with nitrogen were placed 64 g. freshly distilled 4-vinylpyridine and 0.100 g. benzoyl-peroxide. The tube was sealed and the mixture maintained at 50°C in an oil bath for 24 hours. At the end of this period, the resulting polymer was dissolved in 1 liter of methanol.

The polymer in the methanol solution was isolated by pouring the latter into 10 times the volume of rapidly stirred water to give poly-4-vinylpyridine. The poly-4-vinylpyridine was washed further with a large amount of water, filtered and dried.

The dried product exhibited a softening point of 242°–253°C and an intrinsic viscosity of 4.72 measured at a concentration of 0.500 g. of poly-4-vinyl-pyridine/100 ml. of ethanol at 30°C.

Reaction of poly-4-vinylpyridine with β-propiolactone (preparation of polymer electrolytes by the method of the first embodiment Into a reaction apparatus as described in the corresponding part of Example 1 were placed 2.63 g. of this poly-4-vinylpyridine and 90 ml. of methanol. The vessel was flushed with nitrogen and maintained at 30°C. 0.017 g. to 0.050 g. β-propiolactone in a dropping funnel were added dropwise into the flask for 2 hours and the mixture was stirred 1 hour thereafter.

The polymer solution obtained was poured into 200 ml. of rapidly stirred ether to give a gummy polymer which was washed several times further with 100 ml. of rapidly stirred ether to produce a powderly polymer electrolyte.

Table 6-1

| Run No. | β-Propiolactone (g.) | Yield (%) | Graft ratio | Inherent Viscosity | Softening point (°C) |
|---|---|---|---|---|---|
| 6–1 | 0.017 | 91.3 | 0.780 | 2.47 | 173–186 |
| 6–2 | 0.025 | 89.4 | 1.46 | 2.53 | 181–186 |
| 6–3 | 0.050 | 79.4 | 2.55 | 2.51 | 129–139 |

The amount of poly-4-vinylpyridine used for every reaction is 2.63 g. Inherent viscosity was measured at a concentration of 0.500 g. of polymer electrolyte/100 ml. of methanol at 30°C.

The polymer dissolved in methanol was spread on a glass plate kept at 60°–80°C to form a transparent film. The volume resistivity of the film was less than $1 \times 10^{11}$ Ω/cm. (measured at $R_h$ = 42%, Temp. = 18°C and charged voltage = 250 V.).

Preparation of poly-4-vinylpyridine

Into a reaction apparatus as described in the corresponding part of Example 1 were placed 60 g. freshly distilled 4-vinylpyridine, 200 ml. of 4% solution of sodium butylnaphthalene sulfonate and 0.6 g. of benzoyl-peroxide. This mixture was stirred at 30°C for 4 hours.

At the end of this time, the polymer was dissolved in 2 liter methanol and the solution poured into a large volume of rapidly-stirred water to give poly-4-vinylpyridine. The poly-4-vinylpyridine was washed with water and dried.

The softening point was 164°–166°C. The intrinsic viscosity was found to be 1.20 measured at a concentration of 0.500 g. of poly-4-vinylpyridine/100 ml. of ethanol at 30°C. Finally, the volume resistivity of this film was $4 \times 10^{14}$ Ω/cm. ($R_h$= 42%, Temp. = 18°C and charged voltage=250 V.).

Reaction of poly-4-vinylpyridine with β-propiolactone (preparation of polymer electrolyte by the method of the first embodiment)

Into a reaction apparatus as described in the corresponding part of Example 1 were placed 8.41 g. of poly-4-vinylpyridine and 150 ml. methanol. The mixture was stirred at 34°C., 2.88 g. to 11.5 g. of β-propiolactone in a dropping funnel were added dropwise into the flask for 30 min. and the mixture stirred for 1 hour thereafter.

At the end of this time, the polymer-methanol solution was poured into 1 liter of rapidly-stirred ether to form a powderly polymer electrolyte which was washed further with ether and dried.

The polymer was extracted with 150 ml. of chloroform for 3 hours and the component dissolved in chloroform removed.

As shown in Table 6-2, the volume resistivity of this film was low.

Table 6-2

| Run No. | β-propiolactone (g.) | Graft ratio | Inherent viscosity | Softening Point (°C) | Volume inherent resistivity (Ω/cm) |
|---|---|---|---|---|---|
| 6-4 | 2.83 | 0.678 | 1.85 | 136–143 | $.5 \times 10^{10}$ |
| 6-5 | 5.76 | 1.54 | 2.49 | 122–129 | $3 \times 10^{10}$ |
| 6-6 | 11.5 | 1.53 | 1.20 | 112–122 | $3 \times 10^{8}$ |

The amount of poly-4-vinylpyridine used for every reaction was 8.41 g. Inherent viscosity was measured at a concentration of 0.500 g. of polymer electrolyte/100 ml. of methanol at 30°C. The resistivities were measured under the conditions of $R_h$ = 42%, Temp. = 18°C and charged voltage = 250 V.

EXAMPLE 7

Preparation of poly-4-vinylpyridine

Into a glass tube were placed 84 g. freshly distilled 4-vinylpyridine and 0.04 g. benzoyl-peroxide at 50°C in a nitrogen atmosphere. The tube was sealed and maintained at 50°C in an oil bath for 24 hours.

At the end of this time, the resulting polymer was dissolved in 1 liter methanol and the result poured into a large quantity of rapidly-stirred water to give a powderly polymer. The powderly polymer was filtered and dried in a vacuum at the room temperature.

The polymer exhibited a softening point of 176°–189°C and an intrinsic viscosity of 2.80 measured at a concentration of 0.500 g. of polymer/100 ml. of ethanol at 30°C.

Reaction of poly-4-vinylpyridine with $\beta$-propiolactone (preparation of polymer electrolyte by the method of the first embodiment)

Into a glass tube were placed 1.05 g. poly-4-vinylpyridine and 30 ml. methanol, the mixture being agitated to provide a solution thereof. 0.360 to 1.44 g. of $\beta$-propiolactone were added to the polymer solution. The mixture of the polymer solution and $\beta$-propiolactone was then sealed and kept at 50°C in an oil bath for 24 hours.

After the reaction, the resulting polymer solution in methanol was poured into a large amount of rapidly-stirred ether to give a powderly polymer, which was washed with ether, filtered, and dried in a vacuum at room temperature leaving a powderly polymer electrolyte.

Table 7

| Run No. | $\beta$-propiolactone (g.) | Graft ratio | Inherent viscosity | Softening point (°C) |
|---|---|---|---|---|
| 7-1 | 0.360 | 1.67 | 2.11 | 142–145 |
| 7-2 | 0.721 | 1.49 | 2.12 | 134–136 |
| 7-3 | 1.08 | 3.14 | 1.53 | deliquiscent |
| 7-4 | 1.44 | 5.44 | 0.690 | deliquiscent |

The amount of poly-4-vinylpyridine used for every reaction is 1.05 g. Inherent viscosity was measured at a concentration of 0.500 g. of polymer electrolyte/100 ml. of methanol at 30°C.

EXAMPLE 8

Preparation of poly-4-vinylpyridine

Into a polymerization reaction apparatus as described in the corresponding part of Example 1 were placed 127 g. freshly distilled 4-vinylpyridine, 100 ml. of 0.5% solution of sodium butyl naphthalene sulfonate and 0.84 g. benzoylperoxide in nitrogen atmosphere. The mixture was stirred at 30°C for 4 hr., with the obtained polymer being subsequently dissolved in methanol. The polymer-methanol solution was poured into ten times the volume of rapidly stirred water, washed further with equal amounts of water for 8 times, filtered and dried to give powderly polyvinylpyridine.

The softening point was determined to be 183°–185°C. An intrinsic viscosity of 1.74 measured at a concentration of 0.5 g. of poly-4-vinylpyridine/100 ml. of ethanol at 30°C resulted.

Reaction of poly-4-vinylpyridine with $\beta$-propiolactone (preparation of polymer electrolytes by the method of the first embodiment)

Into a reaction apparatus as described in the corresponding part of Example 1 were placed 10.514 g. of the above poly-4-vinylpyridine and 150 ml. of solvents as shown in Table 8-1 in a nitrogen atmosphere. The mixture was stirred at 30°C and 3.60 - 28.8 g. of $\beta$-propiolactone were added dropwise into the flask for 10–70 min. The mixture was subsequently stirred 1 hour and poured into ten times the volume of rapidly-stirred ether, washed 5 times further with ether, filtered and dried to give a powderly polymer electrolyte.

Table 8-1

| Run No. | $\beta$-PL (g.) | Dropping time (min.) | Graft ratio | Softening point (°C) | Inherent viscosity |
|---|---|---|---|---|---|
| 8-1 | 3.60 | 10 | 0.995 | 128–130 | 1.65 |
| 8-2 | 7.21 | 20 | 1.80 | 122–124 | 1.83 |
| 8-3 | 14.4 | 40 | 3.49 | 106–112 | 1.60 |
| 8-4 | 28.8 | 70 | 5.00 | 77–80 | 1.62 |
| 8-5 | 7.21 | 10 | 1.01 | 92–97 | 1.62 |
| 8-6 | 14.4 | 20 | 3.67 | 71–77 | 1.57 |

The amount of poly-4-vinylpyridine used for every reaction was 10.5 g. Inherent viscosity was measured at a concentration of 0.500 g. of polymer electrolyte/100 ml. of methanol at 30°C.

Runs 8-1 through 8-4 employed methanol as solvent while Runs 8-5 through 8-6 used chloroform. The reaction temperature was 30°C.

The methanol solutions of these polymer electrolytes were spread on glass plates at room temperature to give transparent films.

Hydrolysis of polymer electrolytes obtained of the first embodiment by acids or bases of the method of the second embodiment.

Hydrolysis with sodium hydroxide

Run 8-2-1. 3.00 g. of polymer electrolyte (Run 8-2) were dissolved in 40 ml. of water to give a homogeneous solution, which was mixed and then shaken with 28.4 ml. of 0.55 normal aqueous hydroxide until the mixture formed a milky emulsion. Water was vacuum evaporated from the emulsion to yield a white mass, which was washed with water, dried and dissolved in 50 ml. of methanol. The portion insoluble in methanol was discarded while the soluble portion was poured into water, 10 times the volume of the methanol solution, to produce a hydrolyzed polymer electrolyte.

Run 8-5-1. 3.00 g. of polymer electrolyte (Run 8-5) were dissolved in 30 ml. of chloroform to give a homogeneous solution, which was mixed and agitated with 35.7 ml. of 0.55 normal aqueous sodium hydroxide leaving a white precipitation, which was washed with water, dried and dissolved in 50 ml. of methanol.

The portion soluble in methanol was poured into water to precipitate a hydrolyzed polymer electrolyte.

Hydrolysis with hydrochloric acid

Run 8-2-2. 3.00 g. polymer electrolyte (Run 8-2) were dissolved in 40 ml. of water to give a homogeneous solution, which was mixed and agitated with 13.6 ml. of 1.15 normal hydrochloric acid. Volatile solvents and gases were removed from mixture by vacuum evaporation forming a light green solid, which was dissolved in 50 ml. of methanol. The resulting solution was poured into agitated ether 10 times the volume of the solution, to precipitate a hydrolyzed polymer electrolyte.

Run 8-5-2. 2.97 g. of polymer electrolyte (Run 8-5) were dissolved in 30 ml. of chloroform. The resulting solution was mixed and shaken with 17.4 ml. of 1.15 normal hydrochloric acid. Volatile solvents and gases were removed from the resulting solution by vacuum evaporation to give a white solid, which was dissolved in 50 ml. of methanol. The resulting solution was poured into agitated ether, having a volume 10 times that of the solution, to precipitate a hydrolyzed polymer electrolyte.

The above four hydrolysis runs were all carried out at room temperature (20°–25°C).

The properties of the resulting hydrolyzed polymer electrolytes are tabulated in Table 8-2. As shown in Table 8-2, the hydrolyzed polymer electrolytes have high softening points and low volume inherent resistivities. The resistivities were measured from the films obtained from the methanol solutions of the hydrolyzed polymer electrolytes.

Table 8-2

| Run No. | polymer electrolyte (g.) | Acid or base (ml.) | Softening point (C.) | Surface resistivity (ohm) | Volume resistivity (ohm/cm) |
|---|---|---|---|---|---|
| 8-2-1 | 3.00 | 28.4 NaOH | 160–163 | $1.2 \times 10^{14}$ | $3.2 \times 10^{12}$ |
| 8-2-2 | 3.00 | 13.6 HCl | 210–230 | $3.9 \times 10^{14}$ | $5.1 \times 10^{12}$ |
| 8-5-1 | 3.00 | 35.7 NaOH | 187–192 | $8.0 \times 10^{14}$ | $2.9 \times 10^{12}$ |
| 8-5-2 | 2.97 | 17.4 HCl | 206–218 | $1.5 \times 10^{14}$ | $9.1 \times 10^{11}$ |

8-2-1 and 8-2-2 used water as the solvent while 8-5-1 and 8-5-2 employed chloroform. NaOH—sodium hydroxide, HCl—hydrochloric acid. Resistivities were measured at the conditions of $R_h = 42\%$ at 18 C. and a charged voltage of 250 V.

Neutralizations of acid hydrolyzed polymers of the second embodiment by the method of the third embodiment Run No. 8-5-1-1. 0.750 g. of the hydrolyzed polymer were dissolved in 30 ml. of chloroform. 5.4 ml. of 1 normal hydrochloric acid were added to this solution and the mixture was stirred vigorously. The solvent was removed by evaporation under a reduced pressure to produce a light yellow solid which was dissolved in 50 ml. of methanol, the soluble and insoluble parts being separated. The soluble part was poured into 10 times the volume of ether to give acid polymer electrolyte.

EXAMPLE 9

Preparation of 2-vinylpyridine - acrylonitrile copolymer

Into a glass tube were placed 10.514 g. freshly distilled 2-vinylpyridine, 5.306 g. freshly distilled acrylonitrile, 60 ml. N, N-dimethylformamide (DMF), 0.100 g. azobisisobutyronitrile in a nitrogen atmosphere. The tube was sealed and maintained in an oil bath for 24 hr. The obtained polymer solution was poured into 10 times the volume of rapidly-stirred water, filtered and dried in a vacuum to give a powderly copolymer.

The softening temperature was 202°–224°C while the intrinsic viscosity was 0.831 measured at a concentration of 0.5 g. of copolymer/100 ml. of DMF at 30°C. The yield was 93.5%. A volume resistivity of $4.94 \times 10^{13}$ Ω/cm. was measured at $R_h = 42\%$, Temp.= 18°C and Charged voltage = 250 V.

Reaction of 2-vinylpyridine - acrylonitrile copolymer with β-propiolactone (preparation of polymer electrolytes by the method of the first embodiment)

Into a reaction apparatus as described in the corresponding part of Example 1 were placed 8.91 g. of the above copolymer and 150 ml. of chloroform in a nitrogen atmosphere. The mixture was stirred at 30°C in an oil bath. 4.98 g. of β-propiolactone were added dropwise into the flask for 30 min., stirring was continued for one additional hour. The polymer solution was then poured into ten times the volume of rapidly-stirred ether, filtered, and finally dried to yield a polymer electrolyte.

The polymer electrolyte exhibited a softening point of 128°–148°C, an intrinsic viscosity of 0.765 (measured at a concentration of 0.5 g. of polymer electrolyte/100 ml. of DMF at 30°C.) a volume resistivity of $6.2 \times 10^{12}$ Ω/cm (measured at $R_h = 42\%$, Temp. = 18°C and Charged voltage = 250 V.).

A film made from this polymer was transparent and strongly adhesive to a glass plate.

EXAMPLE 10

Preparation of 2-vinylpyridine-3-vinylpyridine copolymer

Into a polymerization reaction apparatus as described in the corresponding part of Example 1 were placed 10.514 g. of freshly distilled 2-vinylpyridine, 10.514 g. of freshly distilled 3-vinylpyridine, 100 ml. of water, a solution of 0.18 g. gelatine 50 ml. of water, a solution of 0.01 g. sodium butyl naphthalene sulfonate in 50 ml. water, 0.01 g. azobisisobutyronitrile, in a nitrogen atmosphere. The mixture was stirred at 50°C for 3 days. The resulting polymer was washed with ten times the volume of normal water and then three times with 10 times the volume of hot water, filtered and dried in a vacuum to give a copolymer.

The softening point was 182°–194°C while the inherent viscosity was 1.26, measured at a concentration of 0.5 g. copolymer /100 ml. methanol at 30°C.

Reaction of 2-vinylpyridine-3-vinylpyridine copolymer with β-propiolactone (preparation of polymer electrolytes by the method of the first embodiment Into a reaction apparatus as described in the corresponding part of Example 1 were placed 10.514 g. of this copolymer and 150 ml. of methanol in a nitrogen atmosphere. The mixture was stirred at 25°–28°C in an oil bath. 7.206 g. of β-propiolactone were added dropwise into the flask for 30 min., stirring being continued one hour thereafter. The obtained polymer solution was poured 3 times into 10 times the volume of rapidly-stirred ether, filtered, and dried to give a polymer electrolyte.

The polymer electrolyte had a softening point of 152°–168°C, an inherent viscosity of 0.68, measured at a concentration of 0.5 g. of polymer electrolyte/100 ml. methanol at 30°C, and a yield of 92.1%.

A film made from this polymer electrolyte was transparent and strongly adhesive to a glass plate.

EXAMPLE 11

Preparation of poly-5-ethyl-2-vinylpyridine

Into a polymerization reaction apparatus as described in the corresponding part of Example 1 were placed 10.514 g. of freshly distilled 5-ethyl-2-vinylpyridine, 50 ml. of water, a solution of 0.6 g. gelatine in 25 ml. of water, a solution of 0.2 g. sodium butyl naphthalene sulfonate in 25 ml. of water, 0.25 g. azobisisobutyronitrile, in a nitrogen atmosphere. The mixture was stirred at 50°C in an oil bath for 3 days. The obtained polymer was washed 5 times with 10 times the volume of rapidly-stirred normal water, and then 3 times with hot water, filtered and dried to give granules of poly-5-ethyl-2-vinylpyridine.

The softening point was found to be 168°–172°C. An intrinsic viscosity of 1.12 measured at the concentration of 0.5 g. poly-5-ethyl-2-vinylpyridine/100 ml. ethanol at 30°C was also determined.

Reaction of poly-5-ethyl-2-vinylpyridine with β-propiolactone (preparation of polymer electrolytes by the method of the first embodiment)

Into a reaction apparatus as described in the corresponding part of Example 1 were placed 13.114 g. poly-5-ethyl-2-vinylpyridine and 150 ml. of methanol in a nitrogen atmosphere. The mixture was stirred at 25°–28°C in an oil bath. 7.206 g. of β-propiolactone were added dropwise into the flask for 30 min., stirring being continued for one more hour. The polymer solution was poured several times into 10 times the volume of rapidly-stirred ether, washed, filtered and dried to give the granules of polymer electrolyte.

The electrolyte exhibited a softening point of 128°–138°C, an inherent viscosity of 0.64, measured at a concentration of 0.5 g. of polymer electrolyte/100 ml. methanol at 30°C, a volume resistivity of $6.8 \times 10^{13}$ $\Omega$/cm. at $R_h = 40\%$, Temp. 20°C, and Charged voltage $= 250$ V. A film made from this polymer was transparent and strongly adhesive to a glass plate.

EXAMPLE 12

Preparation of poly-2-methyl-4-vinylpyridine

Into a polymerization reaction apparatus as described in the corresponding part of Example 1 were placed 45 g. freshly distilled 2-methyl-4-vinylpyridine, 50 ml. of water, a solution of 0.60 g. gelatine in 25 ml. water, a solution of 0.02 g. of sodium butyl naphthalene sulfonate in 25 ml. of water, 0.20 g. azobisisobutyronitrile in a nitrogen atmosphere. The mixture was stirred at 50°C in an oil bath for 3 days. The granules of the polymer obtained were washed with 10 times the volume of rapidly-stirred normal water and then 4 times with 4 times the volume of hot water, filtered and dried to give a fine granules of poly-2-methyl-4-vinylpyridine.

The softening point was 148°–162°C. The intrinsic viscosity was determined to be 0.98, measured at a concentration of 0.5 g. poly-2-methyl-4-vinylpyridine/100 ml. of ethanol at 30°C.

Reaction of poly-2-methyl-4-vinylpyridine with β-propiolactone (preparation of polymer electrolytes by the method of the first embodiment)

Into a reaction apparatus as described in the corresponding part of Example 1 were placed 11.914 g. poly-2-methyl-4-vinylpyridine and 50 ml. of methanol. The reaction flask was flushed with nitrogen with the mixture being stirred at 25°–28°C in an oil bath. 7.206 g. of β-propiolactone were added dropwise into the flask for 30 min. and the mixture was stirred one hour thereafter. The obtained polymer solution was poured 3 times into 10 times the volume of rapidly-stirred ether, filtered and dried to give granules of polymer electrolyte.

The granules had a softening point of 152°–160°C, an inherent viscosity of 0.433 measured at a concentration of 0.5 g. polymer electroylte/100 ml. of methanol at 30°c, a surface resistivity $9.8 \times 10^{13}$ $\Omega$ measured at $R_h = 40\%$, temp. $= 20°C$ and Charged voltage $= 250$ V.

A film made from this polymer was transparent and strongly adhesive to a glass plate.

EXAMPLE 13

Preparation of 3-vinylpyridine - styrene copolymer

Into a glass tube were placed 10.514 g. freshly distilled 3-vinylpyridine, 10.415 g. freshly distilled styrene and 0.100 g. benzoyl-peroxide. The mixture was maintained at 60°C in an oil bath for 24 hr. The resulting polymer solution was poured into 10 times the volume of rapidly stirred water, filtered and dried to give a 3-vinylpyridine-styrene copolymer.

The softening point of the polymer was 156°–162°C. The inherent viscosity was 0.433 measured at a concentration of 0.5 g. copolymer/100 ml. methanol at 30°C.

Reaction of 3-vinylpyridine - styrene copolymer with β-propiolactone (preparation of polymer electrolytes by the method of the first embodiment)

Into a reaction apparatus as described in the corresponding part of Example 1 were placed 9 g. of the above copolymer and 150 ml. of methanol in a nitrogen atmosphere. The mixture was stirred at 25°–28°C. 5.00 g. β-propiolactone were added dropwise into the flask for 30 min. The mixture thereafter was stirred 1 hr. The resulting polymer solution was poured 3times into 10 times the volume of rapidly-stirred ether, filtered and dried to give a polymer electrolyte.

The electrolyte was found to have a softening point of 148°–156°C and an inherent viscosity of 0.450 measured at a concentration of 0.5 g. of polymer electrolyte/100 ml. methanol at 30°C.

A film made from this polymer electrolyte was transparent and strongly adhesive to a glass plate.

Hydrolysis of polymer electrolytes of the first embodiment by bases of the method of the second embodiment Hydrolysis with sodium hydroxide Into a conical flask were placed 5.00 g. of this polymer electrolyte and 100 ml. of chloroform to give a solution to which was added 58 ml. of 1 normal of sodium hydroxide. The polymer solution was then emulsified by being shaken vigorously and permitted to stand for 1 hr. The solvent in the emulsion was removed by evaporation under a reduced pressure to yield a white solid, which was washed with water, filtered and dried. This white solid and 50 ml. of methanol were placed into another conical flask and stirred. The parts soluble and insoluble in methanol were each isolated from each other. The soluble part was poured into 10 times the volume of water to produce a hydrolyzed polymer electrolyte.

The electrolyte exhibited a softening point of 152°–160°C, an inherent viscosity of 0.433, measured at a concentration of 0.5 g. of hydrolyzed polymer electrolyte/100 ml. of methanol at 30°C, and a surface resistivity of film $9.8 \times 10^{13}$ ohm measured at conditions of $R_h = 40\%$, temp. $= 18°$ and Charged voltage $= 250$ V.

While several embodiments of the invention have been shown and described, other variations will be readily apparent to those skilled in the art. Therefore, the invention is not limited to these embodiments but is intended to cover all such variations as may be within the scope of the invention defined by the following claims:

We claim:

1. An electrolyte polymer having an inherent viscosity of from about 0.2 to about 5 at a concentration of 0.5 g./100 ml. methanol at 30°C; at least 10 mole percent of said polymer being polymerized vinylpyridine units having grafted upon the nitrogen thereof poly-$\beta$-propiolactone; and wherein said grafted vinyl pyridine unit is of the structural formula:

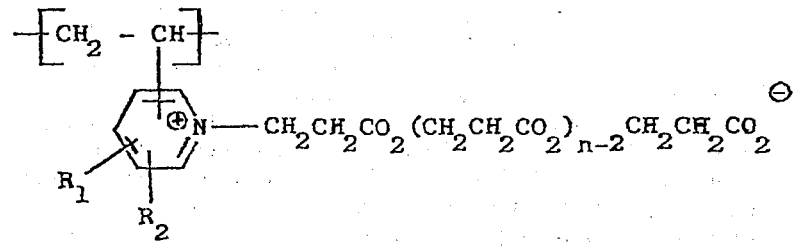

wherein $R_1$ and $R_2$ are hydrogen, methyl or ethyl and $n$ has an average value greater than about 0.2 and less than that producing an X-ray crystalline pattern of poly-$\beta$-propiolactone homopolymer.

2. The polymer of claim 1 wherein said polymer is N-(poly-$\beta$-propiolactone) substituted poly-$\alpha$-vinylpyridine.

3. The polymer of claim 1 wherein said polymer is N-(poly-$\beta$-propiolactone) and substituted poly-$\beta$-vinylpyridine.

4. The polymer of claim 1 wherein said polymer is N-(poly-$\beta$-propiolactone) substituted poly-$\gamma$-vinylpyridine.

5. The polymer of claim 1 wherein said grafted vinylpyridine unit is represented by the structural formula:

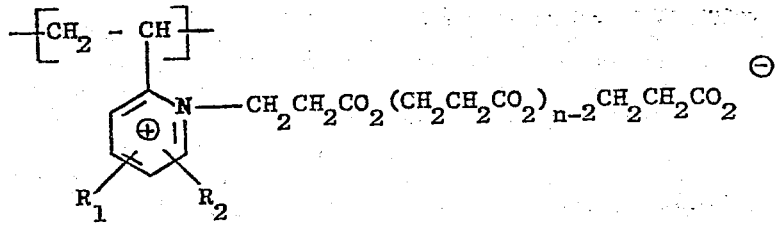

6. The polymer of claim 1 wherein said grafted vinylpyridine unit is represented by the structural formula:

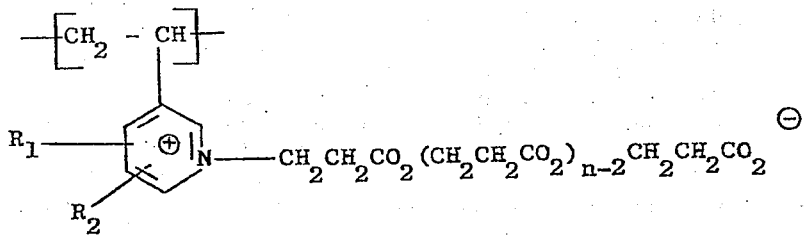

7. The polymer of claim 1 wherein said grafted vinylpyridine unit is represented by the structural formula:

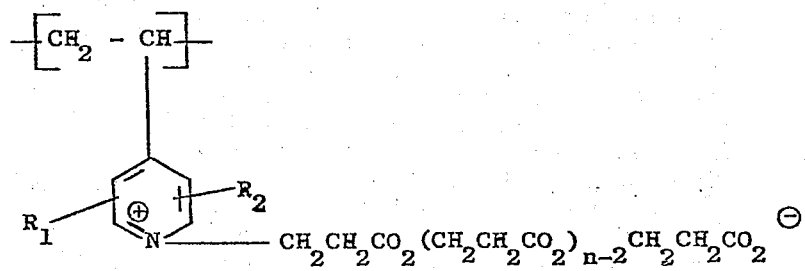

8. The polymer of claim 1 wherein the average value of $n$ is less than about 30.

9. The polymer of claim 1 wherein the average value of $n$ is less than about 5.

10. The acidic salt of the polymer of claim 1 wherein said grafted vinyl pyridine unit is of the structural formula:

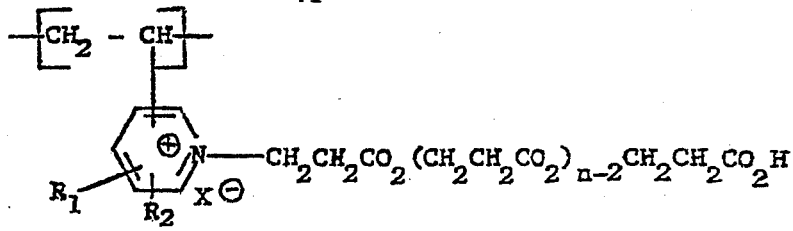

wherein X⁻ represents an anionic group.

11. The alkaline salt of the polymer of claim 1 wherein said grafted vinylpyridine unit is of the structural formula:

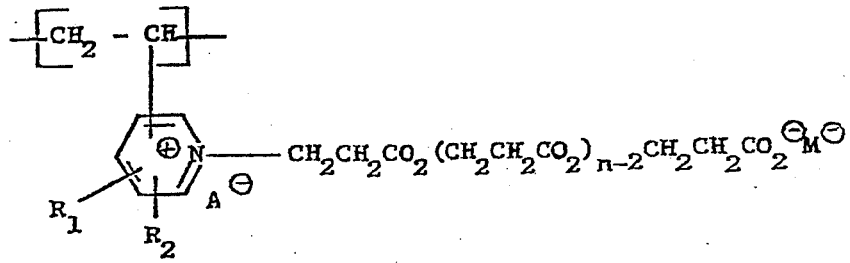

wherein M and A are respectively the cation and anion of alkali $M_rA_p$, $r$ and $p$ being integers greater than zero.

12. An electrolyte polymer having an inherent viscosity of from about 0.2 to 5 at a concentration of 0.5 g./100 ml. methanol at 30°C and consisting essentially of repeating units of vinylpyridine having grafted upon the nitrogen thereof poly-β-propiolactone; and wherein said grafted vinylpyridine unit is represented by the structural formula:

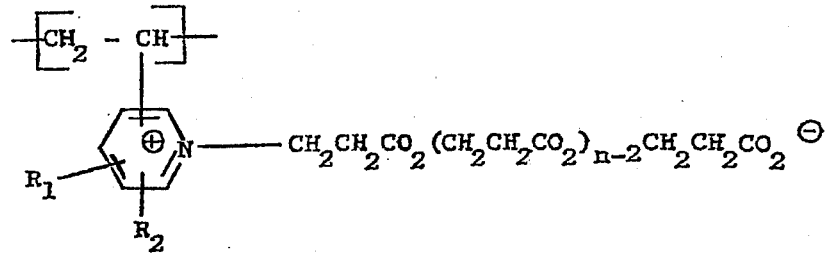

wherein $R_1$ and $R_2$ are hydrogen, methyl or ethyl and $n$ has an average value greater than about 0.2 and less than that producing an X-ray crystalline pattern of poly-β-propiolactone homopolymer.

13. The polymer of claim 12 wherein $n$ is less than about 30.

14. The polymer of claim 12 wherein $n$ is less than about 5.

15. The polymer of claim 12 wherein said polymer is N-(poly-β-propiolactone) substituted poly-α-vinylpyridine, or an acidic or alkaline salt thereof.

16. The polymer of claim 12 wherein said polymer is N-(poly-β-propiolactone) substituted poly-β-vinylpyridine, or an acidic or alkaline salt thereof.

17. The polymer of claim 12 wherein said polymer is N-(poly-β-propiolactone) substituted poly-γ-vinylpyridine, or an acidic or alkaline salt thereof.

18. The polymer of claim 1 wherein said polymerized vinylpyridine units are derived from a member selected from the group consisting of 2-vinylpyridine, 5-ethyl-2-vinylpyridine, 2-methyl-6-vinylpyridine, 2, 4-dimethyl-6-vinylpyridine, 3-vinylpyridine, 2-methyl-5-vinylpyridine, 4-methyl-5-vinylpyridine, 4-vinylpyridine, 2-methyl-4-vinylpyridine.

* * * * *